United States Patent [19]
Kishi et al.

[11] Patent Number: 5,940,817
[45] Date of Patent: Aug. 17, 1999

[54] PROBLEM SOLVING METHOD AND SYSTEM

[75] Inventors: Kiyomi Kishi, Kawasaki; Setsuo Tsuruta, Machida; Toshiya Oshima, Katsuta; Toshihiro Eguchi, Kawasaki, all of Japan

[73] Assignees: Hitachi, Ltd., Tokyo; Hitachi Information & Control Systems, Inc., Hitachi, both of Japan

[21] Appl. No.: 07/835,374

[22] Filed: Feb. 14, 1992

[30] Foreign Application Priority Data

Feb. 15, 1991 [JP] Japan ................................ 3-021808

[51] Int. Cl.$^6$ ...................................... G06F 15/18
[52] U.S. Cl. ............................... 706/46; 706/45
[58] Field of Search ............... 395/51, 906, 905, 395/50, 902

[56] References Cited

U.S. PATENT DOCUMENTS

| | | | |
|---|---|---|---|
| 4,926,343 | 5/1990 | Tsuruta et al. | 706/45 |
| 5,177,684 | 1/1993 | Harker et al. | 701/117 |
| 5,224,204 | 6/1993 | Tsuruta et al. | 706/46 |

OTHER PUBLICATIONS

Komaya, et al., "Estrac–III: An Expert System for Train Traffic Control in Disturbed Situations," IFAC Symposium, Sep. 1989, 147–153.

Cohen, et al., The Handbook of Artificial Intelligence vol. III, Addison–Wesley Pub. Co., 1982, 541–550.

Gibbons, et al., "ASAP: AI–Based Situation Assessment and Planning", IEEE 1988 National Aerospace and Electronics Conf., May 1988, 932–939.

Tano, et al., "EUREKA–II: A Programming Tool for Knowledge –based Real Time Control Systems", Intl. Workshop on Art. Intel. for Indus. Appl., 1988, 370–375.

Tsuruta, et al., "A Knowledge–based Interactive Train Scheduling System—Aiming At Large Scale Complex Planning Expert Systems", Intl. Wksp. on Art. Intel. for Indus. Appl., 1988, 490–495.

acar, et al., "Global Feedback Methods of a Hierarchical Controller for Real–Time Execution and Replanning," 5th IEEE Intl. Symposium on Intelligent Control, Sep. 1990, 40–44.

Komaya, et al., "A Knowledge–Based Approach for Railway Scheduling" Seventh IEEE Conf. on Art. Intel. Applications, Feb. 1991, 404–411.

Komaya, et al., "A Rule–Based Control of Train Traffic in Distributed Situations," IEE Japan, IECE Translations, vol. 107, 1987, 173–180.

*Primary Examiner*—Robert W. Downs
*Attorney, Agent, or Firm*—Antonelli, Terry, Stout & Kraus, LLP

[57] ABSTRACT

To generate a problem solving plan and/or a system control plan respectively in association with the contents of the problem and/or the system operation conditions, there are disposed element knowledge for storing therein problem solving methods and system control guidelines and harmonizing knowledge for selecting and/or modifying the element knowledge. Depending on the contents of the problem and/or the system operation conditions, selections and modifications are executed on the problem solving methods and system control guidelines so as to produce an optimal problem solving method and/or an optimal system control guideline. Even when the solving method, the problem solving condition, and system executing situation vary depending on a given problem solving condition and a given system executing situation, an appropriate solving plan can be proposed.

22 Claims, 28 Drawing Sheets

F I G. 1
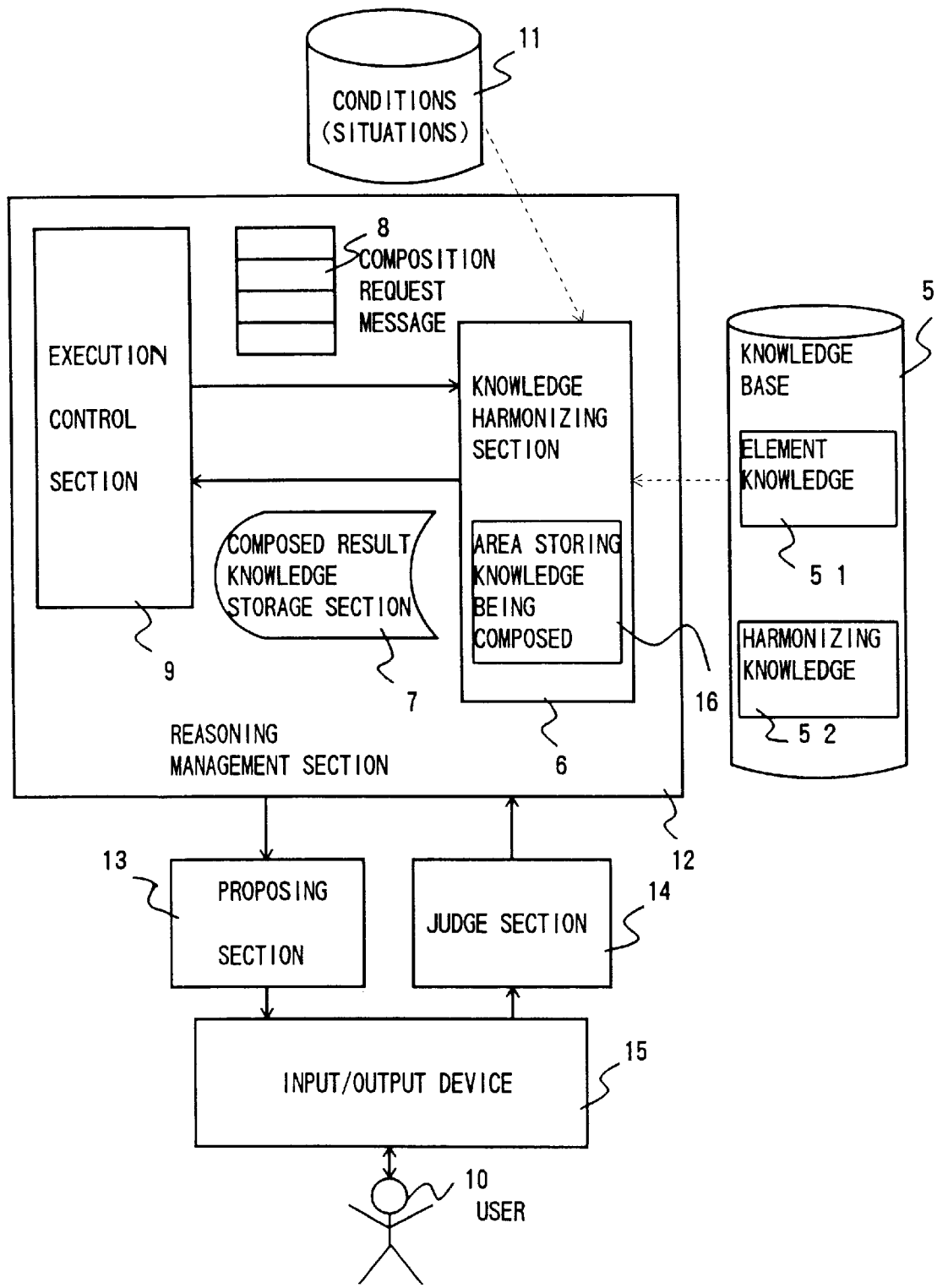

| | |
|---|---|
| CLASS | STRATEGY |
| NAME | RESULT MONITORING |
| APPLICABLE GOAL | PROCESS MANAGEMENT |
| LOWER-LEVEL GOAL | [ PROCESS MONITORING, GENERATION OF MODIFIED SCHEDULE ] |
| STRATEGY TYPE | DEPLOYMENT |

2020

| | |
|---|---|
| CLASS | STRATEGY |
| NAME | RESCHEDULING |
| APPLICABLE CONDITION | FINISH PROCESS |
| APPLICABLE GOAL | GENERATION OF MODIFIED SCHEDULE |
| STRATEGY TYPE | PROCEDURE |

RESCHEDULING PROCEDURE BODY

2030

| | |
|---|---|
| CLASS | STRATEGY |
| NAME | SCHEDULE MODIFICATION |
| APPLICABLE CONDITION | FINISH PROCESS |
| APPLICABLE GOAL | GENERATION OF MODIFIED SCHEDULE |
| LOWER-LEVEL GOAL | [DISCUSS METHOD OF MODIFICATON, MODIFY SCHEDULE] |
| STRATEGY TYPE | DEPLOYMENT |

| | |
|---|---|
| CLASS | HARMONIZATION |
| NAME | PROCESS DELAY JUDGEMENT |
| TYPE | SELECTION |
| GROUP | PROCESS MONITORING |
| CONDITION | FINISH PROCESS |
| CONTENTS | IF PROCESS DELAY IS NOT LESS THAN C1 HOURS, THEN SELECT RESCHEDULING. IF PROCESS DELAY IS NOT MORE THAN C2 HOURS, THEN SELECT WORKING EFFICIENCY IMPROVEMENT. IF PROCESS DELAY IS BETWEEN C2 TO C1 HOURS, THEN SELECT SCHEDULE MODIFICATION. |

2120

| | |
|---|---|
| CLASS | HARMONIZATION |
| NAME | PROCESS DELAY JUDGEMENT MODIFICATION 1 |
| TYPE | MODIFICATION |
| LEVEL | SELECTION |
| GROUP | PROCESS DELAY JUDGEMENT |
| CONDITION | BEGINNER |
| CONTENTS | MINIMIZE C2 VALUE OF PROCESS DELAY JUDGEMENT KNOWLEGE. |

2130

| | |
|---|---|
| CLASS | HARMONIZATION |
| NAME | PROCESS DELAY JUDGEMENT NEGATION 1 |
| TYPE | NEGATION |
| LEVEL | SELECTION |
| GROUP | PROCESS DELAY JUDGEMENT |
| CONDITION | DELIVERY DATE IS APPROACHING |
| CONTENTS | RESCHEDULING CONNOT BE SELECTED. |

2140

| | |
|---|---|
| CLASS | HARMONIZATION |
| TYPE | PROPOSAL |
| GROUP | PROCESS MONITORING |
| CONDITION | MECHANICAL FAILURE OCCURRENCE |
| CONTENTS | EXECUTE RESCHEDULING |

F I G. 2 3
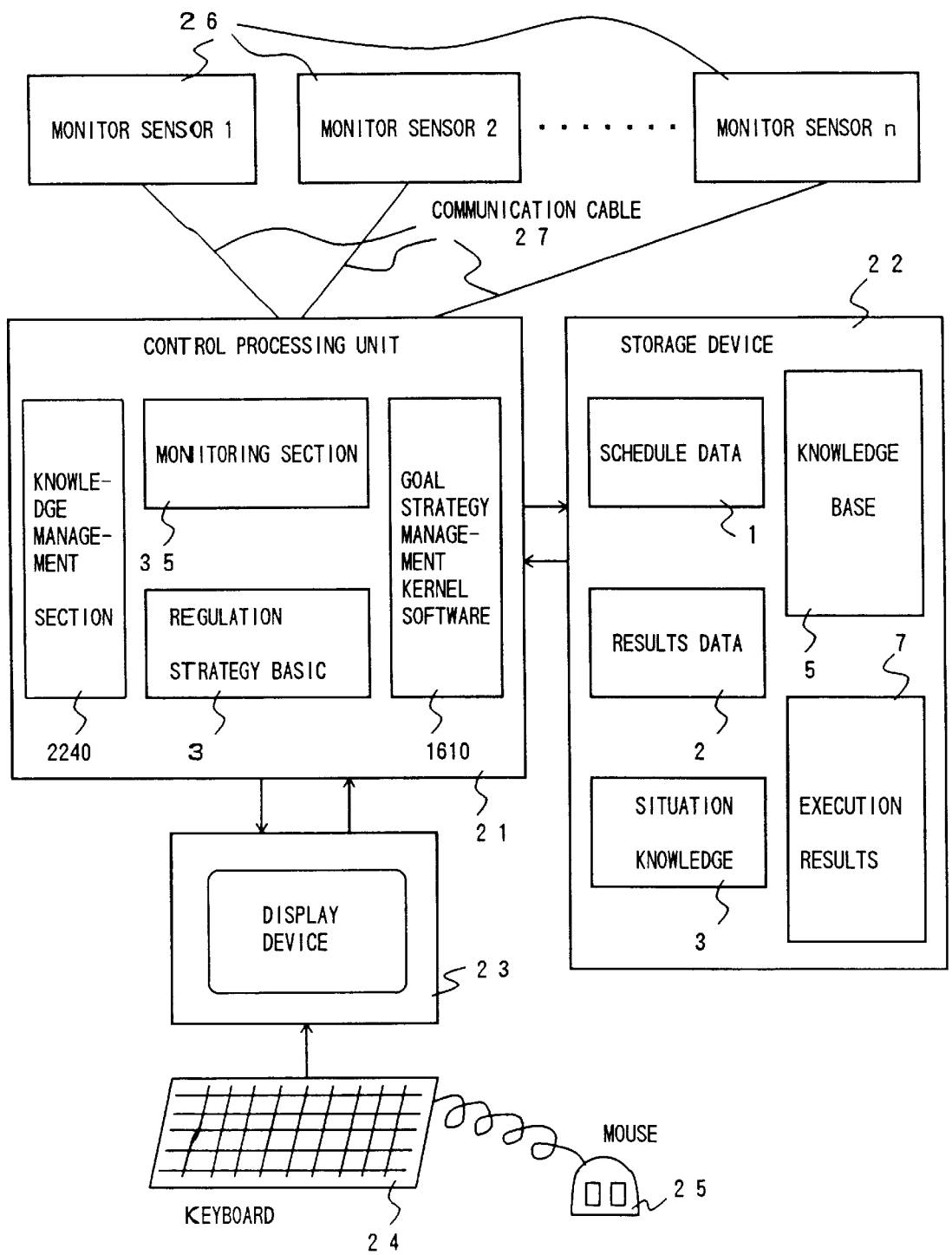

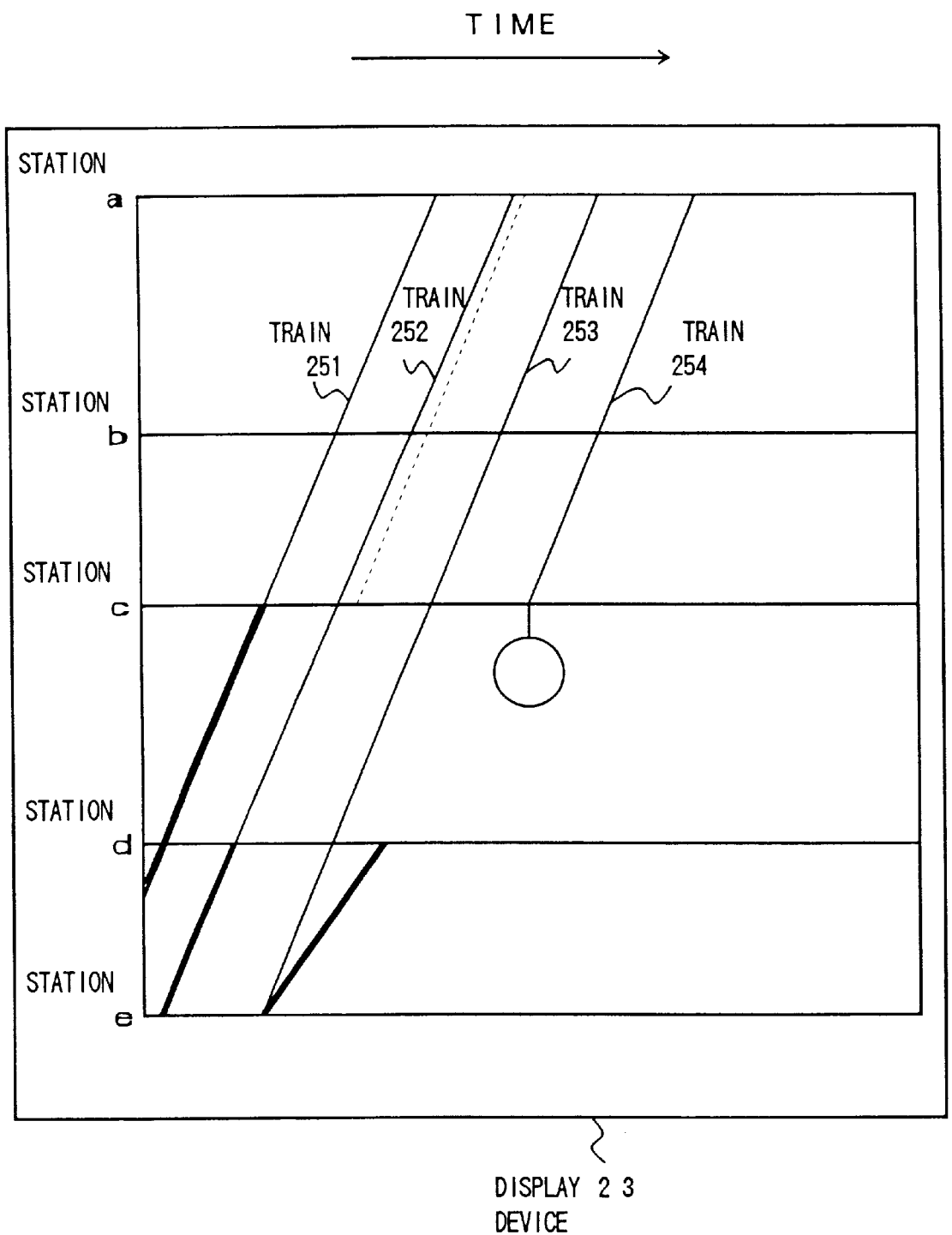

| CLASS | HARMONIZATION |
|---|---|
| NAME | TRAIN REGULATION PROPOSAL 1 |
| TYPE | PROPOSAL |
| GROUP | GENERATION OF REGULATION PLAN |
| CONDITION | TRAIN X DELAYS AT LEAST THREE MINUTES AT STATION B. |
| CONTENTS | DELAY DEPARTURE OF TRAIN Y1 FROM STATION P BY M1 SECONDS AND DELAY DEPARTURE OF TRAIN Y2 FROM STATION Q BY M2 SECONDS |

2620

| CLASS | HARMONIZATION |
|---|---|
| NAME | TRAIN REGULATION IMPOSSIBLE |
| TYPE | NEGATION |
| LEVEL | DELETION |
| GROUP | LAST TRAIN, SECOND LAST TRAIN |
| CONDITION | TRAIN IN OPPOSITE DIRECTION DELAYED |
| CONTENTS | SECOND LAST TRAIN DOES NOT BE THE TARGET |

2630

| CLASS | HARMONIZATION |
|---|---|
| NAME | TRAIN REGULATION PROPOSAL MODIFICATION 1 |
| TYPE | MODIFICATION |
| LEVEL | PROPOSAL |
| GROUP | TRAIN REGULATION PROPOSAL 1 |
| CONDITION | UNUSUALLY LARGE NUMBER OF PASSENGERS |
| CONTENTS | REPLACE M2 BY M3 |

2640

| CLASS | HARMONIZATION |
|---|---|
| NAME | ADJUSTMENT AMOUNT MODIFICATION |
| TYPE | MODIFICATION |
| LEVEL | DATA |
| GROUP | EXPRESSION 1 |
| CONDITION | TARGET TRAIN HAS BEEN CONTROLLED BEFORE |
| CONTENTS | REDUCE CONTROL AMOUNT |

F I G. 27
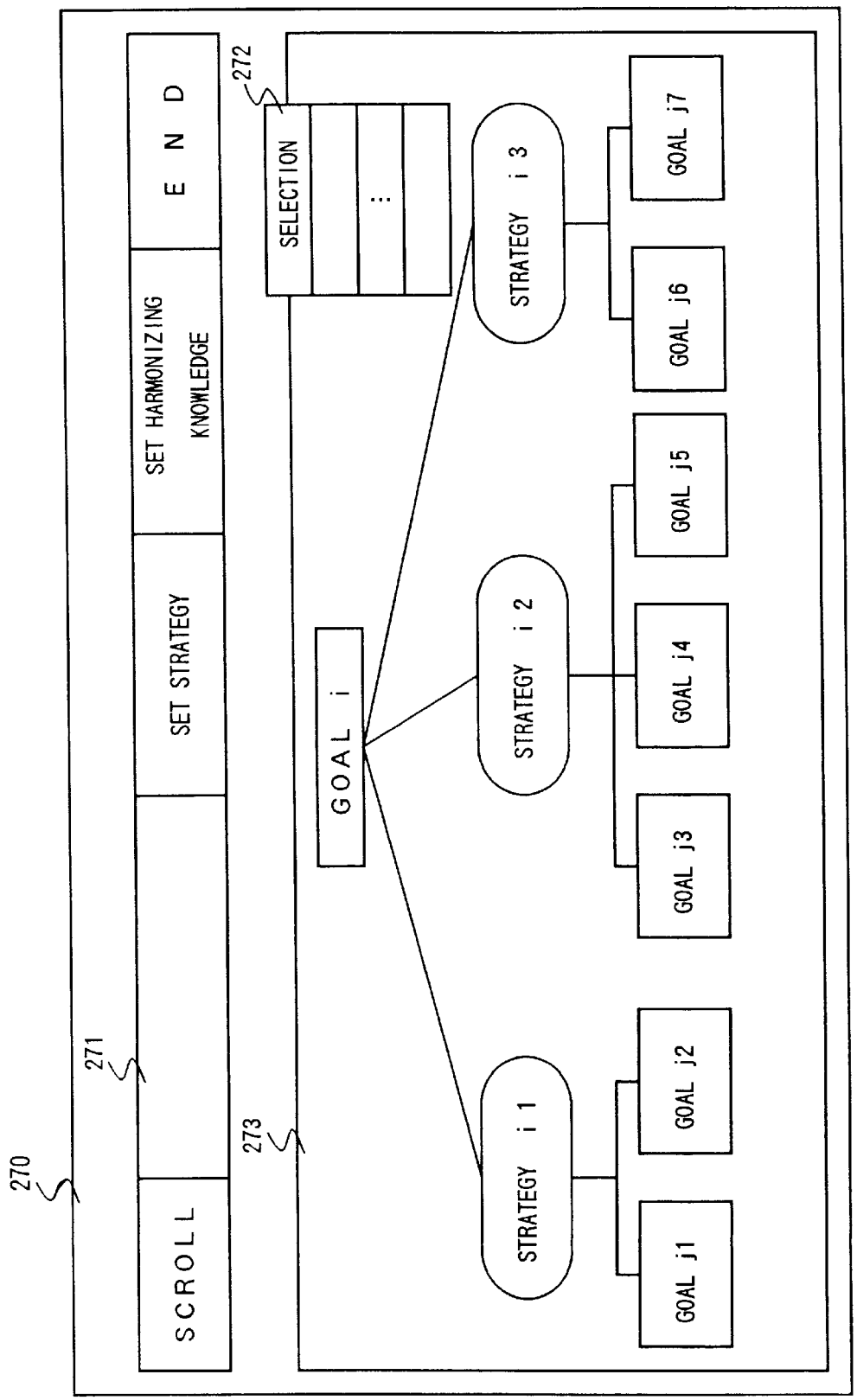

PROBLEM SOLVING METHOD AND SYSTEM

BACKGROUND OF THE INVENTION

The present invention relates to a problem solving method and a problem solving system such as 1 train regulation system for restoring disturbances in a train diagram or a train group control system for guaranteeing an identical interval between running trains, wherein the method and system requires circumstantial judgement.

Conventionally, as described in pages 173 to 180 of "Development of Train Regulation Support System by Knowledge Engineering Approach", IECE Transactions C, Vol. 2, 1987, it has been a common practice, when preparing a control plan, to extract general rules from methods employed by experts, thereby producing the control plan depending on the rules.

In the example of the conventional technology, a problem solving plan is created depending on rules representing the experts' methods in a computer system; however, if it is desired to take a flexible action or operation when the system is changed in association with operation conditions and input data, the rules become to be quite complicated. This makes it difficult to generate a knowledge base. Moreover, to achieve a comprehensive judgement in consideration of global circumstances or situations, the knowledge base becomes much more complex, which leads to a problem that such a knowledge base cannot actually be generated in a practical system.

SUMMARY OF THE INVENTION

It is therefore an object of the present invention to provide a problem solving system in which even when the system alters due to operation conditions and input data, an appropriate problem solving plan can be proposed and in which a comprehensive judgement can be achieved to produce a detailed problem solving plan.

In order to achieve the object above, according to the present invention, there are disposed a knowledge section (element knowledge section) for storing therein problem solving methods and restrictions, a storage section (harmonizing knowledge section) for storing therein knowledge to select and to modify element knowledge depending on system operation conditions and input information, and a processing section (knowledge harmonizing section) for modifying and selecting element knowledge according to contents of the harmonizing knowledge. Depending on features of the system and characteristics of a schedule or plan, element knowledge is selected and the selected element knowledge is modified in accordance with the harmonizing knowledge, thereby solving the problem.

In the problem solving system of the present invention, the system conducts according to the harmonizing knowledge an operation to automatically select, from a plurality of solving methods and control methods respectively prepared as element knowledge, those matching features of the system and characteristics of a schedule. Since the harmonizing knowledge used as references for the selection can also be modified depending on changes in the situations, the problem can be solved in conformity with the features of the system and characteristics of the schedule. Furthermore, problems repeatedly appearing in the system and solving methods thereof and disturbance situations and control contents repeatedly taking place in the system are memorized as harmonizing knowledge to be issued as proposals. Consequently, it is unnecessary to duplicatedly accomplish reasoning for such problems and disturbance situations, namely, the same reasoning operation need not be conducted in each system operation. In consequence, a proper problem solving method and control contents can be quickly proposed according to the system features and the schedule characteristics. Moreover, knowledge necessary for the comprehensive judgement is stored as harmonizing knowledge such that when a comprehensive judgement is to be conducted, unnecessary portions of element knowledge for local judgement can be ignored and negligible portions of processing of the harmonizing knowledge and element knowledge can be deleted. Resultantly, it is possible to propose detailed problem solving plans and control plans onto which complicated physical conditions and comprehensive judgement are reflected.

BRIEF DESCRIPTION OF THE DRAWINGS

These and other objects and advantages of the present invention will become apparent by reference to the following description and accompanying drawings wherein:

FIG. 1 is a diagram showing the overall construction of a problem solving method according to the present invention;

FIG. 20 is a diagram showing an example of the strategy object description in the problem of FIG. 18;

FIG. 21 is a diagram showing an example of the harmonizing object description in the problem of FIG. 18;

FIG. 23 is a diagram showing the system construction of the train regulation system;

FIG. 25 is a diagram showing an example of a screen displaying a train regulation state;

FIG. 26 is a diagram showing a description example of a harmonizing object in the train regulation system;

FIG. 27 is a diagram showing an example of an object setting screen; and

DESCRIPTION OF THE PREFERRED EMBODIMENTS

Figure 2:
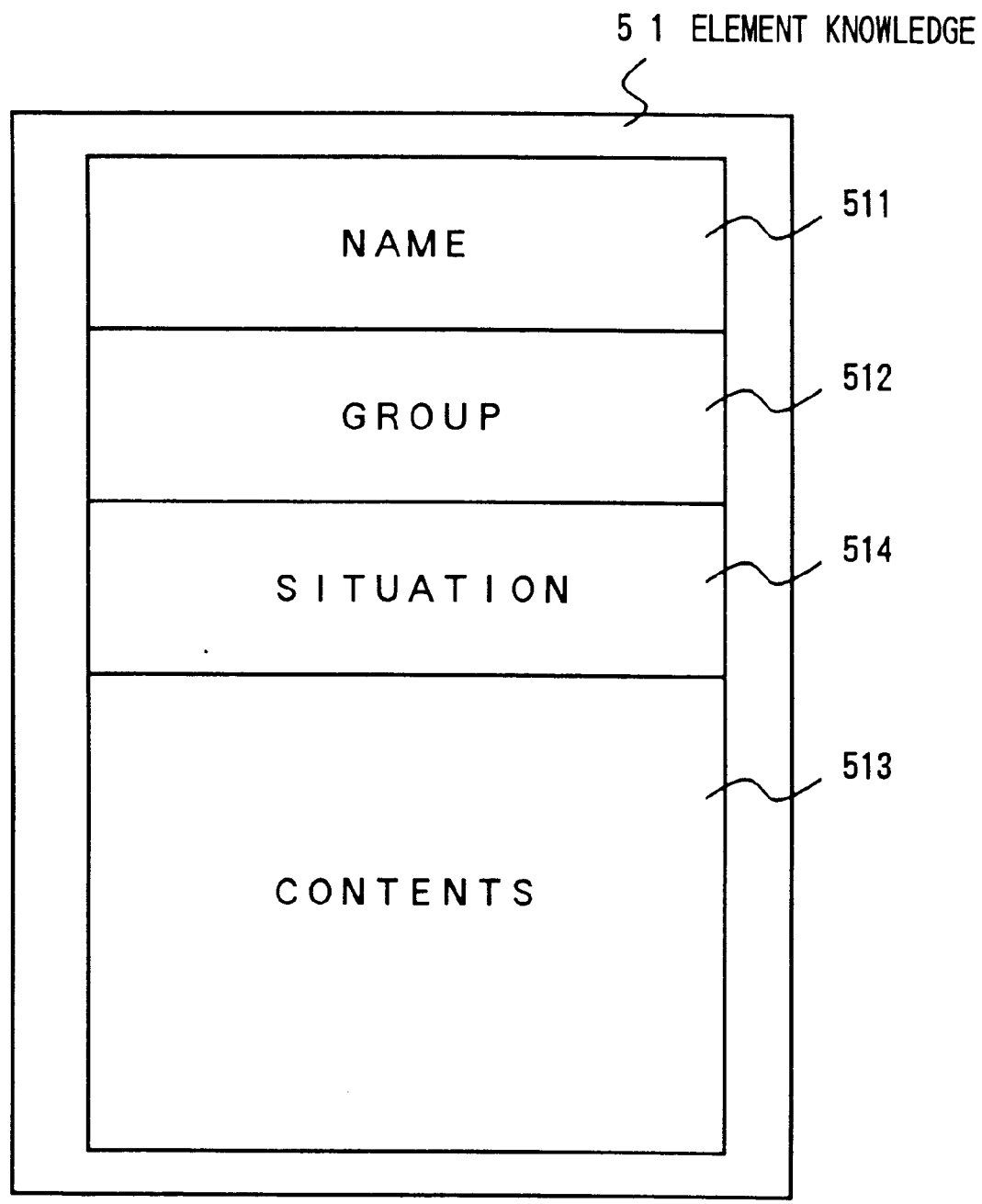
FIG. 2 is a diagram showing an example of the structure of element knowledge.
Figure 3:
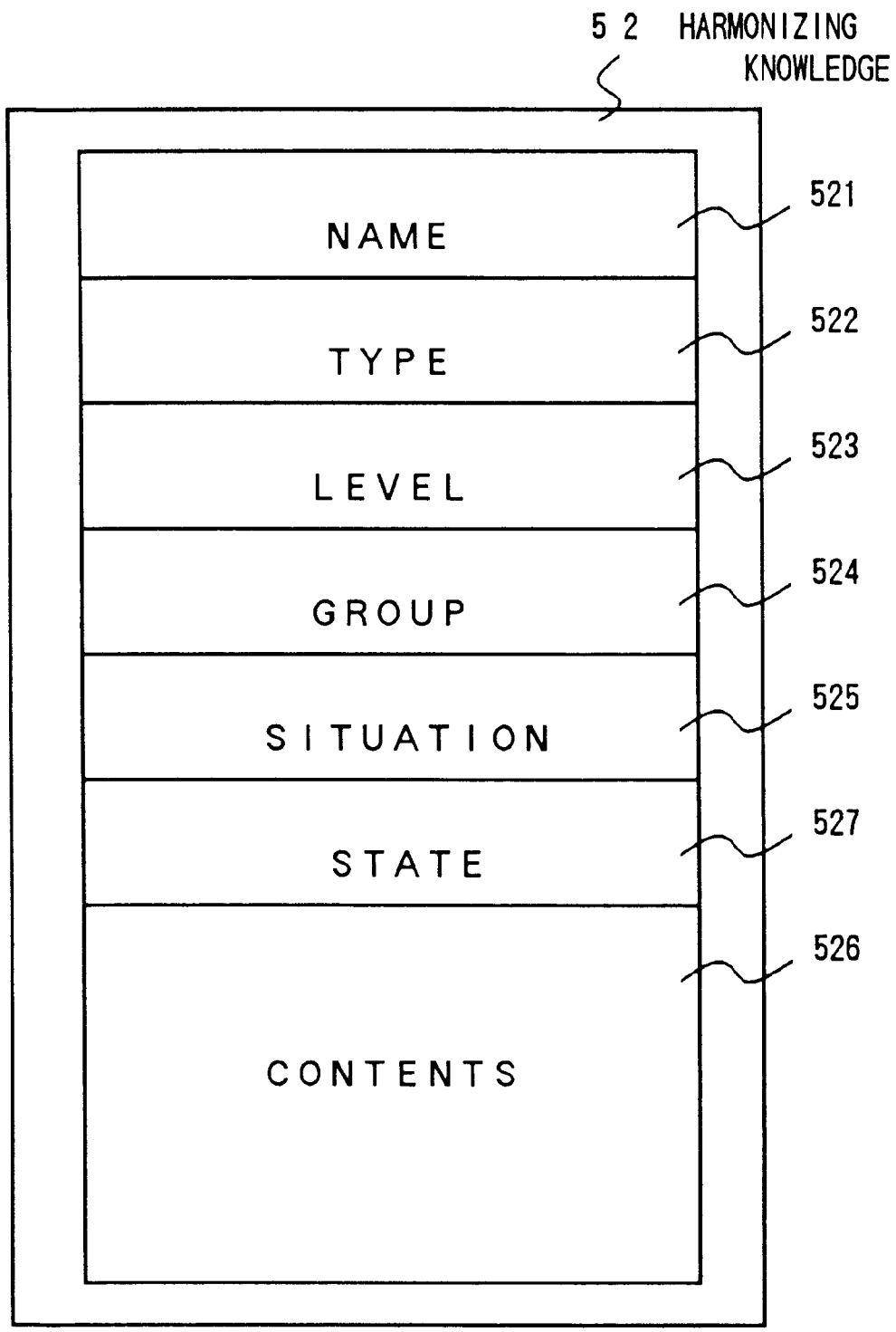
FIG. 3 is a diagram showing an example of the structure of harmonizing knowledge.
Figure 4:
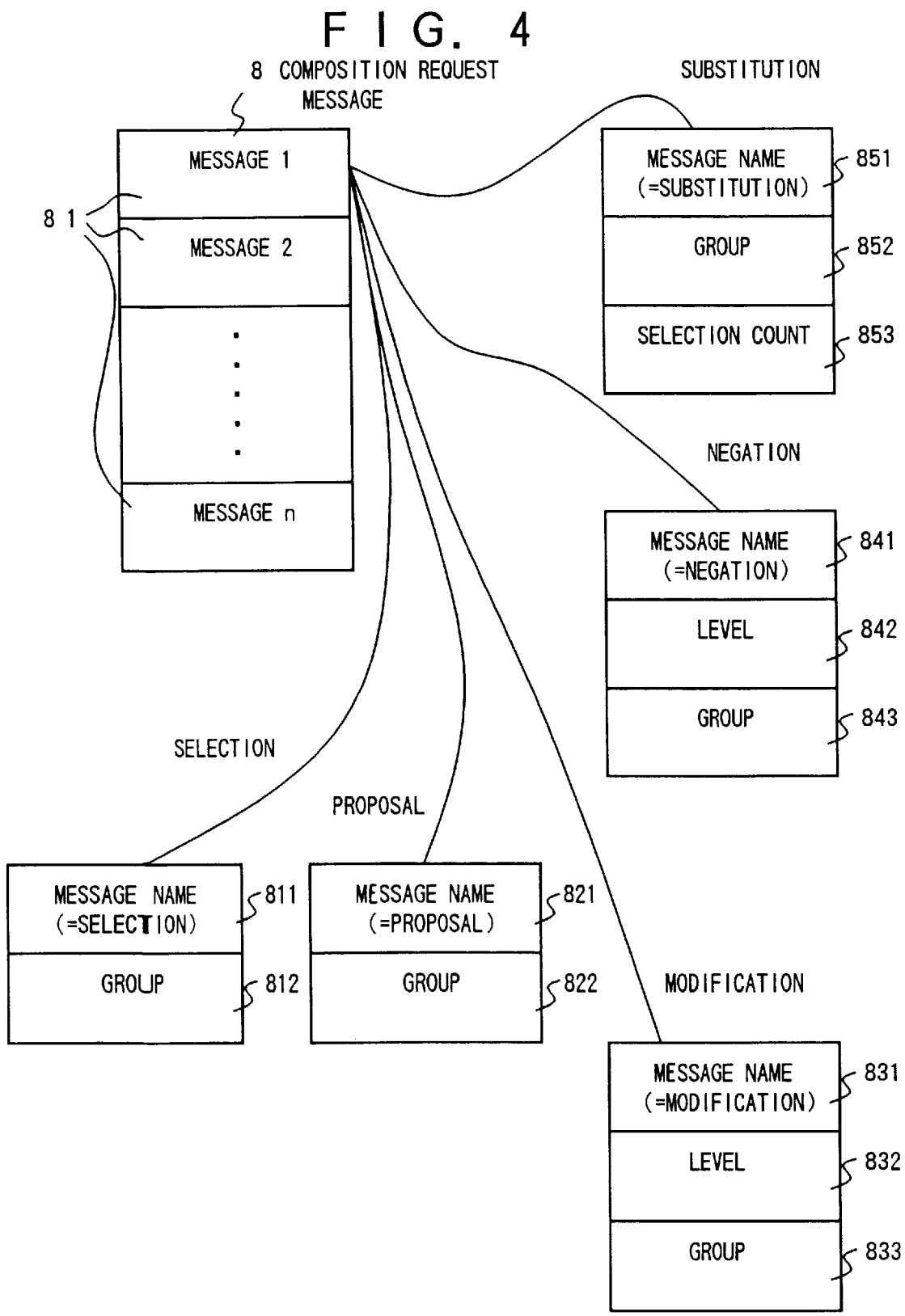
FIG. 4 is a diagram showing an example of the constitution of a composition request message to a knowledge harmonizing section.

FIG. 1 shows the structure of software adopted in a problem solving method according to the present invention. In this software configuration, a proposal or proposing section 13 conducts an inference or reasoning operation based on a reasoning management section 12 controlling reasoning executions and proposes a result of the reasoning via an input/output device 15 to a user 10. The user 10 judges the proposal contents and inputs a result of the judgement to a judge section 14. An execution control section 9 is disposed to produce a problem solving plan and/or a system control plan and specifically conducts reasoning execution controls such as the initiation, interruption, suspension, re-initiation, and termination of a reasoning execution. A condition (situation) storage section 11 is disposed to store therein premises of a problem and operation conditions or situations of a system. A knowledge base 5 storing therein knowledge necessary for solving problems is constituted with element knowledge 51 including problem solving methods and the like and harmonizing knowledge 52 to be used when there exist a plurality of problem solving methods (stored as element knowledge 51). The harmonizing knowledge 52 includes knowledge for selecting necessary element knowledge therefrom, knowledge for solving conflicts, if any, existing between element knowledge 51, and knowledge for altering element knowledge 51 to be suitable for the current state of the system. FIGS. 2 and 3 show detailed contents of the element knowledge 51 and the harmonizing knowledge 52, respectively. A harmonizing knowledge section 6 references the contents of the condition storage section 11 to select and/or to modify the element knowledge 51 depending on the harmonizing knowledge 52. An area 16 storing therein knowledge being composed is disposed to store therein intermediate results of a knowledge composing operation achieved by the knowledge harmonizing section 6. A composed result knowledge storage section 7 is used to store therein knowledge for the problem solving operation. The knowledge is selected and/or modified depending on system situations by the knowledge harmonizing section 6. A composition request message 8 is issued from the execution control section 9 to request a knowledge composition to the knowledge harmonizing section 6. FIG. 4 shows the detailed contents of the composition request message 8. The system user achieves operations, for example, to send an inquiry to the execution control section 9 for a problem solving state and to input judgement results of a proposed solution plan and schedule solving guidelines.

FIG. 2 shows the detailed contents of the element knowledge 51. The element knowledge 51 comprises a name slot 511 storing therein a knowledge name, a group slot 512 to be loaded with a group name associated with the knowledge, a situation slot 514 storing therein a knowledge state (active/deactivated state), and a content section to be loaded with contents of the knowledge.

FIG. 3 shows in detail the contents of the harmonizing knowledge 52. This knowledge 52 includes a name slot 521 for storing therein a name of the knowledge, a type slot 522 to be loaded with a type of the knowledge, a level slot 523 for storing therein a processing level of the knowledge, a group slot 524 for storing a group name of the knowledge, a condition slot 525 to be loaded with a knowledge execution condition, a state slot 527 for storing therein a knowledge state (active/deactivated) of the knowledge, and a content section 526 to be loaded with contents of the knowledge. The knowledge type of this example may be specified as either one of the types including selection, proposal, modification, negation, and substitution. Harmonizing knowledge of the type of selection, proposal, modification, negation, or substitution will be simply referred to as selection, proposal, modification, negation, or substitution knowledge herebelow. The selection knowledge is used, when a plurality of problem solving methods are present in a situation, to select one of the methods. The selection knowledge 52 includes, as the harmonizing knowledge description, a name slot 521 loaded with a knowledge name, a type slot 522 containing a harmonizing knowledge type (=selection), a level slot 523 left empty, a group slot 524 loaded with a group of element knowledge set as object of selection, a condition slot 525 containing a condition for a selection execution, and a content section 526 loaded with element knowledge to be selected when the condition is satisfied. The proposal knowledge is used in a case of repeatedly appearing problems where solutions thereof and situations of disturbances of solving plans have reproducibility or appear in an identical manner and control plans for solving the problem are identical in the repeated occurrences of such problems. The situations of disturbances of plans and the control plans for the situations are beforehand stored as knowledge in the proposal knowledge. When described in the form of the harmonizing knowledge 52, there are included a name slot 521 loaded with a knowledge name, a type slot 522 containing a harmonizing knowledge type (=proposal), a level slot 523 left empty, a group slot 524 loaded with a name of group of the knowledge, a condition slot 525 containing a situation and a condition for executing a proposal, and a content section 526 loaded with the proposal contents. The modification knowledge is adopted to correct or to modify the contents of a problem solving method and a control plan depending on the situation. When described in the form of the harmonizing knowledge, the modification knowledge includes a name slot 521 loaded with a knowledge name, a type slot 522 containing a harmonizing knowledge type (=modification), a level slot 523 loaded with a modification processing level, a group slot 524 loaded with a name of element knowledge 51 or harmonizing knowledge 52 as an object of the modification, a condition slot 525 containing a modification condition, and a content section 526 loaded with the modification objective knowledge and modification contents. The modification processing level indicates a kind of knowledge as an object of modification and is assigned to either one of the proposal, selection, substitution, and data levels. The proposal, selection, substitution, and data levels are respectively specified for knowledge used to modify the contents of the proposal knowledge, selection knowledge, substitution knowledge, and element knowledge 51, respectively. The negation knowledge is employed in a selection of problem solving methods, for example, some solving methods are beforehand removed from the selection objects depending on a condition and in a deletion of a portion of knowledge contents attained as a result of a selection and/or a modification (for example, when the knowledge resultant from the selection and/or modification is constituted with a plurality of processing, a portion of the processing becomes to be unnecessary depending on a condition). The negation knowledge includes, when described as the harmonizing knowledge 51, a name slot 521 containing a knowledge name, a type slot 522 loaded with a harmonizing knowledge type (=negation), a level slot 523 containing a level of knowledge to be negated, a group slot 524 loaded with a name of group to which the pertinent knowledge belongs, a condition slot 525 loaded with a condition, and a content section 526 containing negation contents, for example, a name of element knowledge to be removed from the selection objects if the selection level is specified and a name of an objective knowledge and a portion to be deleted if the deletion level is specified. The negation level designates a kind of processing and is specified as a selection level or a deletion level. The selection level is adopted when element knowledge 51 to be removed from the selection objects is described, whereas the deletion level is employed when a portion of the contents of element knowledge 51 is to be deleted. The substitution knowledge is utilized when a plurality of problem solving methods exist in a situation so as to select a plurality of methods therefrom. The substitution knowledge includes, when described as the harmonizing knowledge 51, a name slot 521 containing a knowledge name, a type slot 522 loaded with a harmonizing knowledge type (=substitution), a level slot 523 left empty, a group slot 524 loaded with a group name of the knowledge as the selection object, a condition slot 525 containing a condition of a selection execution, and a content section 526 containing a name of element knowledge 51 to be selected when the condition is satisfied. In this case, when priority levels are assigned to a plurality of element knowledge 51, the description is conducted in the descending order of priority levels.

FIG. 4 shows in detail the contents of the composition request message 8. The composition request message 8 is constituted with a string of messages 81 such as selection and modification messages. The contents of these messages vary depending on message types as follows.

Message=selection: Message 81 includes a message name 811 (=selection) and a selection objective element knowledge group name 812.

Message=proposal: Message 81 includes a message name 821 (=proposal) and a proposal knowledge group name 822.

Message=modification: Message 81 includes a message name 831 (=modification), a modification processing level 832, and a modification objective knowledge group name 833. The modification level designates a type of knowledge as the modification object and is specified as a proposal, selection, substitution, or data level. The proposal, selection, substitution, and data levels are specified for modification of the contents of the proposal, selection, substitution, and element knowledge, respectively.

Message=negation: Message 81 includes a message name 841 (=negation), a negation processing level 842, and a negation objective knowledge group name 843. The negation processing level indicates a type of processing and is specified as a selection or deletion level. The selection and deletion levels are adopted to remove the specified element knowledge 51 from the selection objects and to delete a portion of the selected or modified element knowledge 51, respectively.

Message=substitution: Message 81 includes a message name 851 (=substitution), a selection object element knowledge group name 852, and a selection knowledge count 853.

Figure 5:
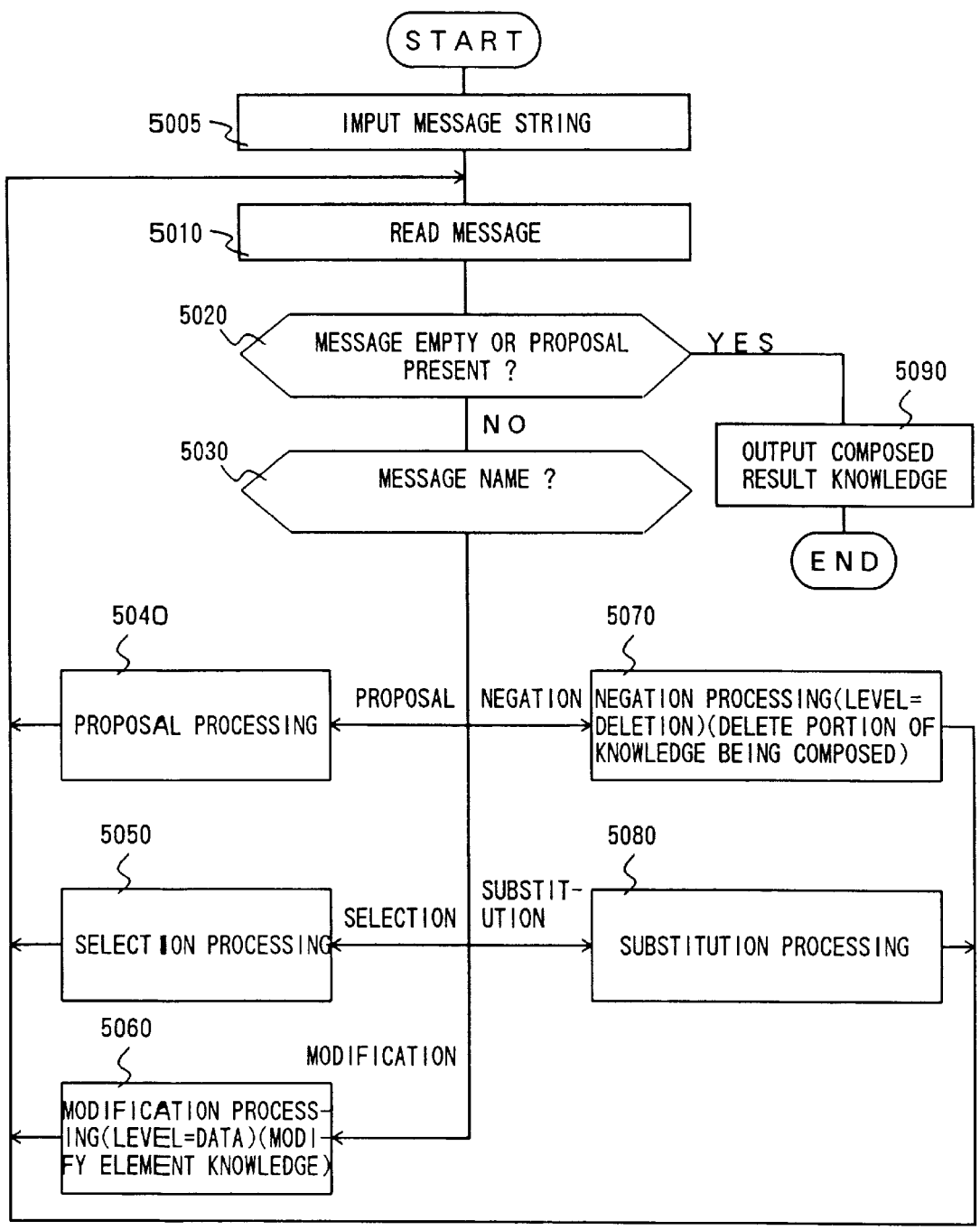
FIG. 5 is a general flowchart showing the procedure of processing executed by the knowledge harmonizing section.
Figure 6:
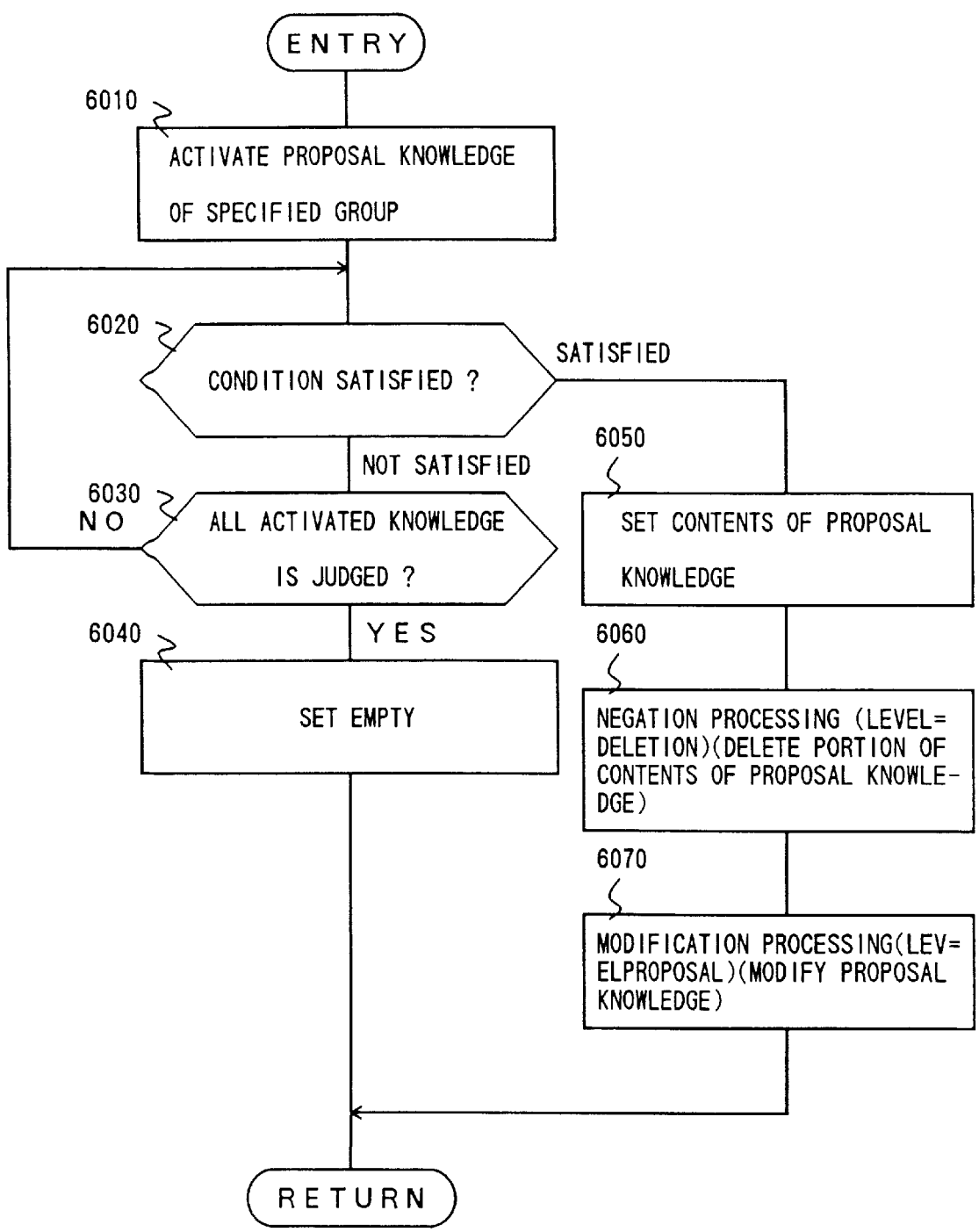
FIG. 6 is a flowchart showing the procedure of a proposal processing of the knowledge harmonizing section.
Figure 8:
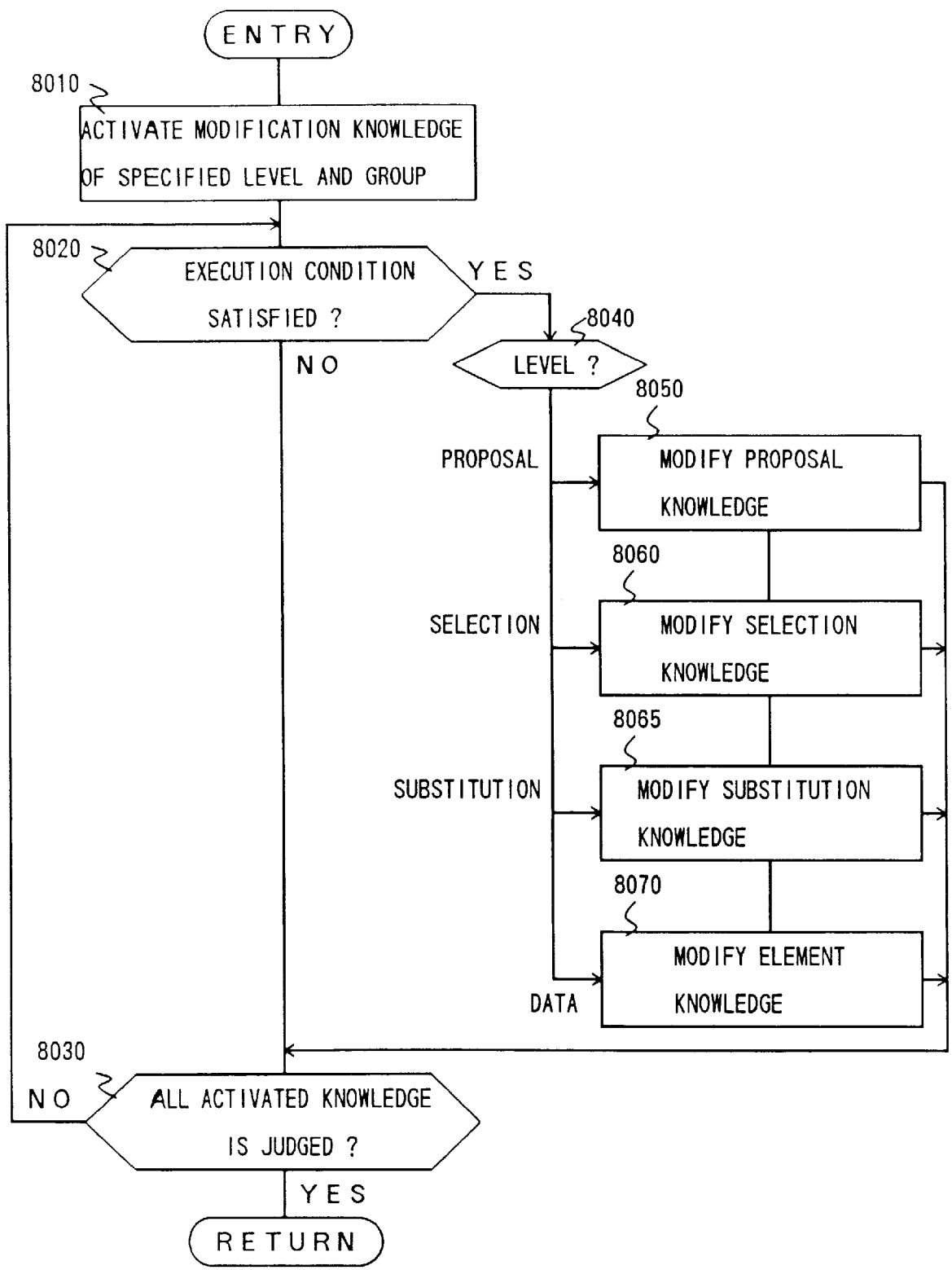
FIG. 8 is a flowchart showing the procedure of a correction or modification processing of the knowledge harmonizing section.
Figure 9:
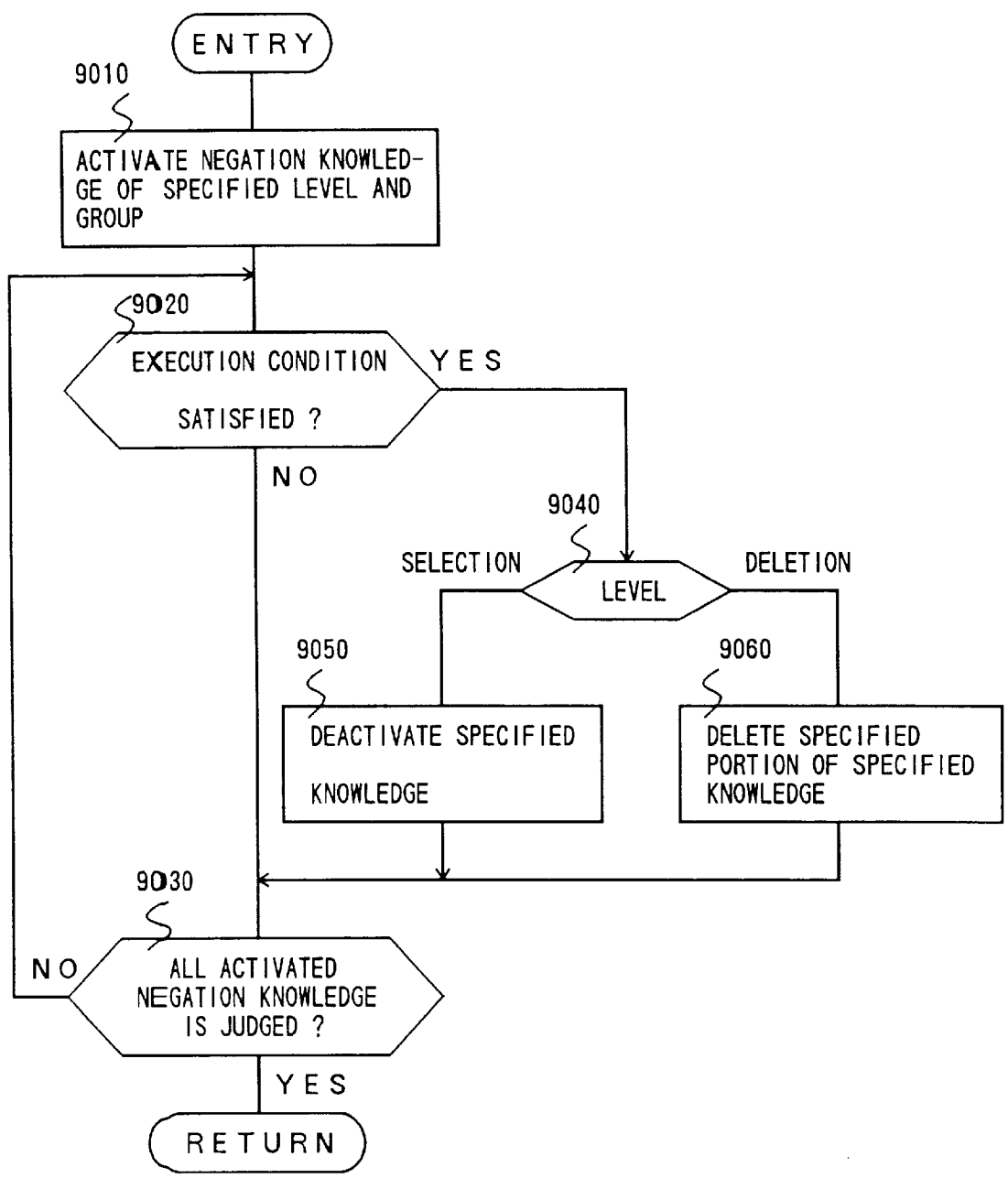
FIG. 9 is a flowchart showing the procedure of a negation processing of the knowledge harmonizing section.
Figure 10:
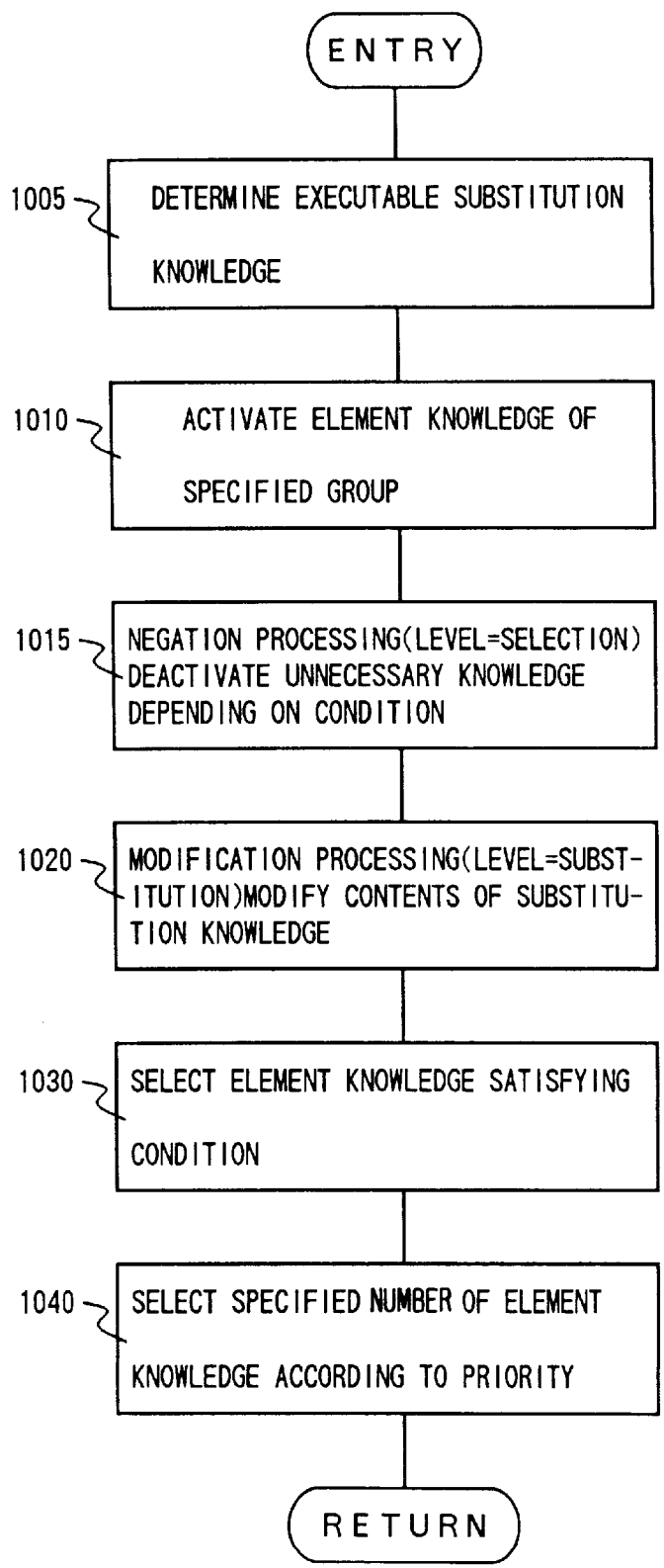
FIG. 10 is a flowchart showing the procedure of a substitution processing of the knowledge harmonizing section.

FIG. 5 is a general processing flowchart of the knowledge harmonizing section 6. In the knowledge harmonizing section 6, a step 5005 is first executed for an input of a knowledge composition request message 8 issued from the execution control section 9. The knowledge composition message 8 is a message string as shown in FIG. 4. In a step 5010, the respective constituting execution messages (an execution message is a component message 81 shown in FIG. 4) are sequentially acquired from the input message string 8 in a message-by-message fashion. In a step 5020, when the knowledge composition message 8 becomes empty or when proposal knowledge is presented, the termination of processing (YES) is assumed such that a step 5090 outputs knowledge as a composition result, thereby terminating the processing. In the step 5020, if the processing is judged to be continued (NO), a step 5030 checks the contents of the execution message to initiate execution of a processing routine related to the message. For example, in a case where an execution message of a proposal request is inputted, a step 5040 initiates a proposal processing for execution. FIG. 6 shows in detail the contents of the proposal processing. Similarly, for an input of an execution message requesting a selection, a step 5050 initiates a selection processing of which the contents are shown in detail in FIG. 7. When an execution message of a modification request is inputted, a step 5060 initiates a modification processing. However, assume now that only the modification processing with Level=Data (the modification object is element knowledge) is effective for the execution. FIG. 8 shows the details about the modification processing. For an input of an execution message requesting negation, a step 5070 initiates a negation processing. However, for the execution, it is assumed that only the negation processing with Level=Negation (only to delete a portion of the contents of knowledge being composed) is effective. FIG. 9 shows in detail the contents of the negation processing. When an execution message of a substitution request is inputted, a step 5070 initiates a substitution processing of which the detailed contents are shown in FIG. 10.

FIG. 6 shows a flowchart of the proposal processing. In a step 6010, proposal knowledge of a specified group is first activated. In the knowledge activation, the pertinent knowledge is set to an executable state. More specifically, there may be adopted, for example, a method in which the activation objective knowledge is copied from a location of the knowledge base onto an execution area (activation area), a method in which a state slot 527 is disposed as a knowledge slot so as to set the value of the state slot 527 of the activation objective slot to an activated value, a method in which the knowledge name of the activation objective knowledge is stored in an activation area so as to conduct processing of knowledge having the stored knowledge name. Next, in a step 6020, each proposal knowledge is judged for decision of whether or not the execution condition is satisfied. If this is the case, the contents of the proposal is set in a step 6050. If neither proposal knowledge thus activated satisfies the execution condition, it is judged in a step 6030 whether there exists any activated knowledge not judged. If all have been studied the empty is set in step 6040 and then the processing is terminated. On the other hand, if more activated knowledge not judge exists processing returns to step 6020. The proposal contents set in the step 6050 is subjected to a negation processing in a step 6060 such that a portion of the proposal contents is deleted if necessary since a partial deletion processing is to be conducted, the negation processing level is set as deletion). Moreover, a modification processing is carried out in a step 6070 to achieve a modification of the proposal contents when required (since the modification object is proposal knowledge, the modification processing level is set as proposal), thereby terminating the processing.

Figure 7:
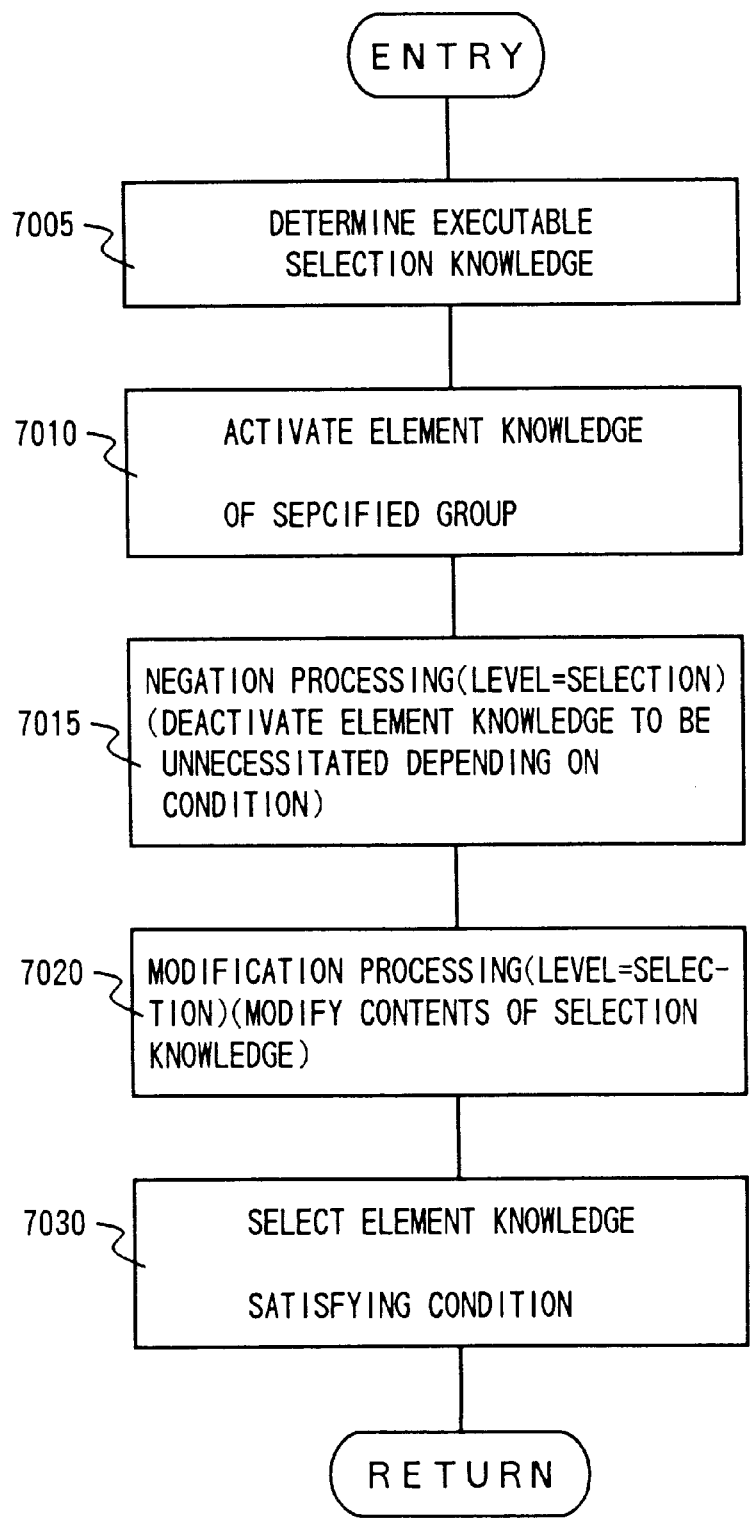
FIG. 7 is a flowchart showing the procedure of a selection processing of the knowledge harmonizing section.

FIG. 7 is a flowchart showing the contents of the selection processing. A step 7005 first determines selection knowledge to be executed (i.e. a selection reference or standard is determined in conformity with the condition). In a step 7010, the element knowledge 51 of the specified group is activated (namely, the selection object is activated). Subsequently, in a step 7015, a negation processing is accomplished on the element knowledge 51 activated in the step 7010 to deactivate the element knowledge 51 to be removed from the selection object depending on the condition. In this situation, since the unnecessary knowledge is to be removed from the selection object, the negation processing level is set as selection. The knowledge deactivation means that the pertinent knowledge is not subjected to the selection. Moreover, in a step 7020, a modification processing is conducted for the selection knowledge (i.e. the selection standard; the modification level is set as selection since the modification object is selection knowledge) so as to match the selection standard with the system situation. Thereafter, in a step 7030, from the element knowledge 51 not deactivated in the objective group, element knowledge satisfying the selection standard is selected. That is, in the step 7030, from the element knowledge 51 which has been activated in the step 7010 and which has not been deactivated in a step 7015, element knowledge satisfying the selection standard is selected and is stored as a selection result in the storage area 16 for storing knowledge being composed. The storage area 16 is used to store therein outputs from the respective composition processing (such as selection and modification processing) of the knowledge composition processing so as to output a final composition result as composition result knowledge 7 to the execution control section 9.

FIG. 8 is a flowchart showing the contents of the modification processing. First, in a step 8010, modification knowledge of a specified level and a specified group is activated. Next, the following processing is repeatedly carried out for each activated knowledge. In a step 8020, a check is made to determine whether or not the execution condition is satisfied. If this is the case, in a step 8040, the specified level is examined to achieve based thereon the processing as follows. Namely, in a case of a proposal level (modification object=proposal knowledge), the contents of the proposal knowledge are modified in a step 8050. For a selection level (modification object=selection knowledge), the contents of the selection knowledge are modified in a step 8060. When a substitution level (modification object= substitution knowledge) is specified, the contents of the substitution knowledge is modified in a step 8065. In a case of a data level (correction object=element knowledge), the contents of the element knowledge are modified in a step 8070.

FIG. 9 is a flowchart showing the contents of the negation processing. First, in a step 9010, negation knowledge related to the specified level and group is activated. For example, when a group x is specified, negation knowledge having the group slot value=x and the level slot value=selection is activated. Next, the following processing is repeatedly executed for each negation knowledge thus activated. In a step 9020, a check is made to decide whether or not the execution condition is satisfied. If this is the case (YES), the specification level is examined in a step 9040 to accomplish the following processing based on the content of the specification level. Namely, when the content is the selection level, a step 9050 is executed to process the element knowledge 51 of the specified group so as to deactivate element knowledge having the name designated in the content section 526 of the negation knowledge. For the deletion level, a step 9060 is executed to delete a portion denoted in the content section 526 of the negation knowledge from the contents of the negation objective knowledge 51 described in the content section 526 of the negation knowledge.

FIG. 10 is a flowchart showing the contents of the substitution processing. First, in a block 1005, executable substitution knowledge (selection standard) is determined to activate element knowledge 51 of a group specified in a step 1010. Subsequently, in a step 1015, the negation processing is achieved for the element knowledge 51 activated in the step 1010 (since a negation processing level is set as selection, the element knowledge 51 other than the selection object is deactivated e.g. the value of the state slot 514 is set to a deactivated value). In addition, a modification processing is accomplished for the substitution knowledge determined in the step 1005 to match the selection standard with the system situation. Thereafter, in a step 1030, a selection is achieved on the element knowledge 51 which has been activated in the step 1010 and which has not been deactivated in the step 1015, thereby choosing element knowledge satisfying the selection standard. Moreover, the specified number of element knowledge 51 selected in the step 1040 is selected in the priority level order. If the priority level judgement of the element knowledge 51 is impossible, the selection is conducted in an order in which the condition has been determined to be satisfied for the knowledge.

Next, description will be given of an example in which the present invention is applied to a process management problem.

Figure 11:
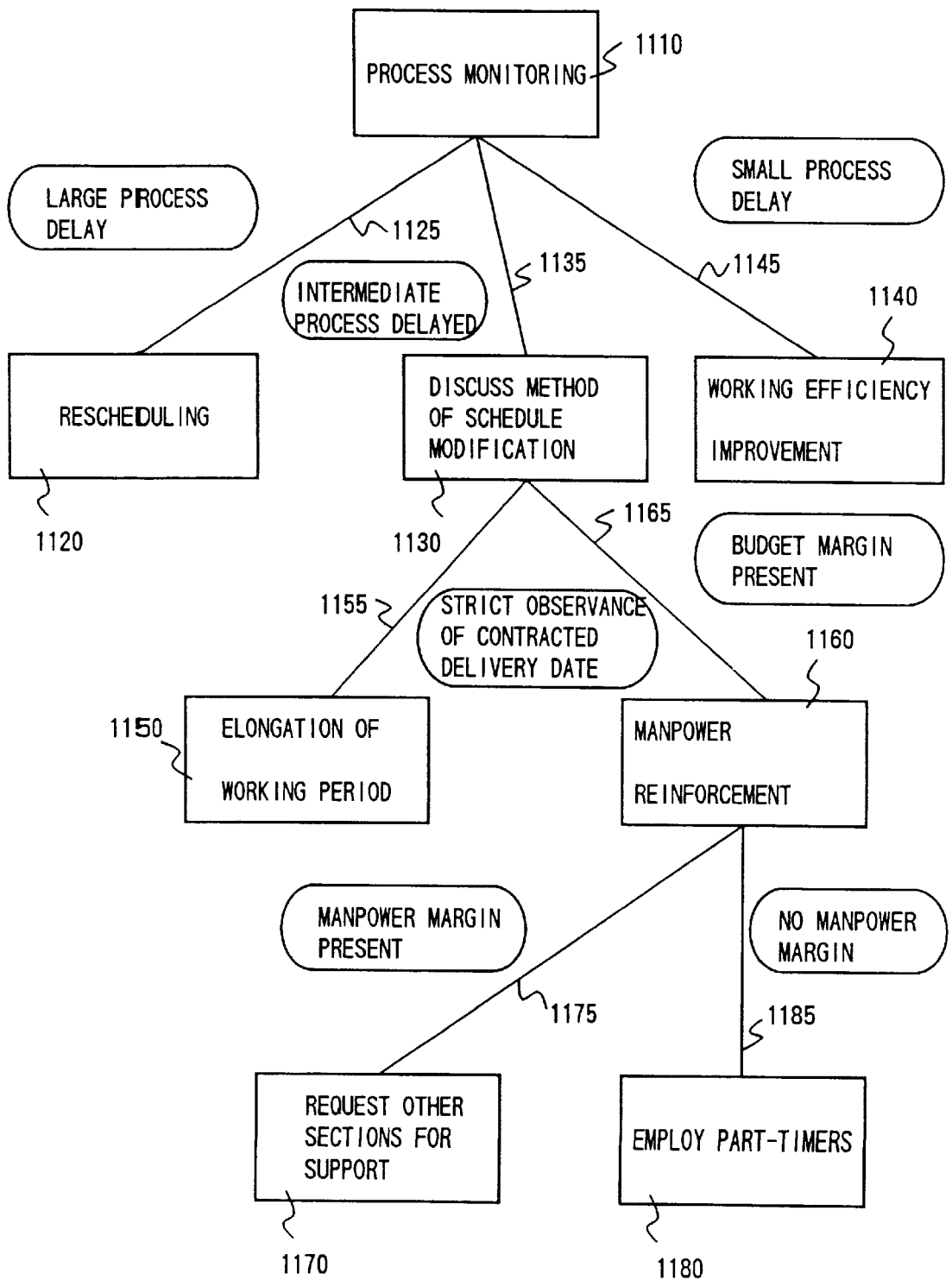
FIG. 11 is a schematic diagram showing an example of a process management problem.

FIG. 11 is a diagram showing an example of the processing contents of the process management problem. First, in a step 1110, a process monitoring operation is executed. When a considerable process delay is found in this step, a route 1125 is selected such that a rescheduling job is accomplished in a step 1120. When the process delay is of an intermediate magnitude, a route 1135 is selected to conduct a schedule modification check in a step 1130. For a process delay of a small magnitude, a route 1145 is selected to issue an instruction of a job or work efficiency improvement in a step 1140. If it is decided in the step 1130 that the strict observance of a contracted delivery date is essential, a route 1155 is selected to issue an instruction of a working period elongation in a step 1150. On the other hand, if the budget is judged to include a margin in a step 1130, a route 1165 is selected to discuss a manpower reinforcement in a step 1160. If it is determined in the step 1160 that a manpower margin is found in another section, a route 1175 is selected to issue a request to the section for support in a step 1170. Otherwise, a route 1185 is selected to instruct an employment of part-timers.

Figure 12:
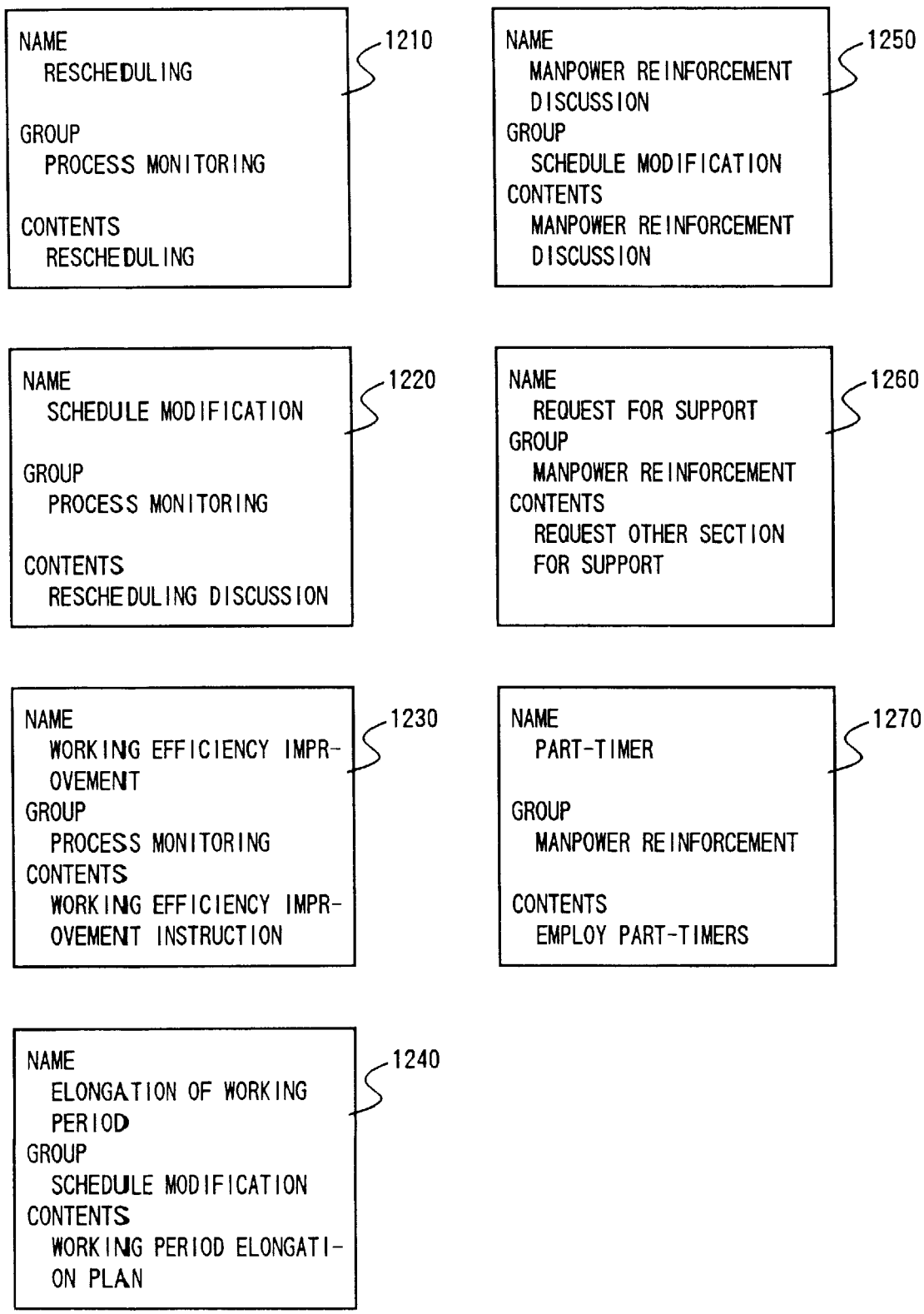
FIG. 12 is a diagram showing an example of description of element knowledge in the process management problem of FIG. 11.

FIG. 12 is an example of description of element knowledge 51 in the problem of FIG. 11. This example includes descriptions 1210, 1220, and 1230 of element knowledge 51 related respectively to the steps 1120, 1130, and 1140, which are possibly executed after the step 1110 of FIG. 11. Moreover, there are included descriptions 1240 and 1250 of element knowledge 51 respectively related to the steps 1150 and 1160, which are possibly executed after the step 1130 of FIG. 11. In addition, this diagram includes descriptions 1260 and 1270 of element knowledge 51 respectively related to the steps 1170 and 1180, which are possibly executed after the step 1160 of FIG. 11.

Figure 13:
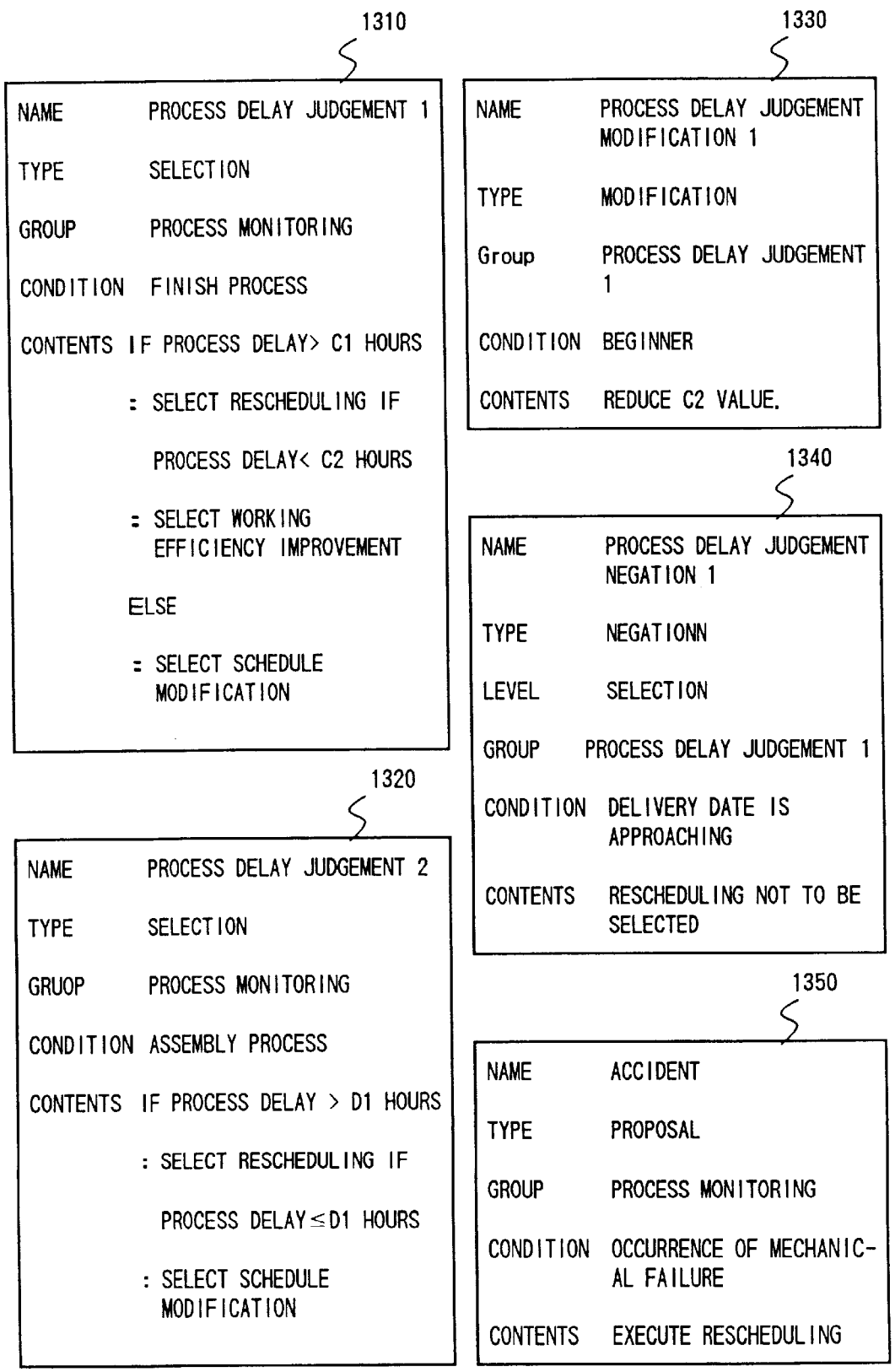
FIG. 13 is a diagram showing an example of description of harmonizing knowledge in the process management problem of FIG. 11.

FIG. 13 is an example of description of harmonizing knowledge 52 used in the problem of FIG. 11. This example includes descriptions 1310 and 1320 of selection knowledge disposed to select the next processing from the step 1110 of FIG. 11, a description 1330 of modification knowledge employed to modify the contents of the selection knowledge 1310, a description 1340 of negation knowledge utilized to select the next processing from the step 1110 of FIG. 11, and a description 1350 of proposal knowledge.

Figure 14:
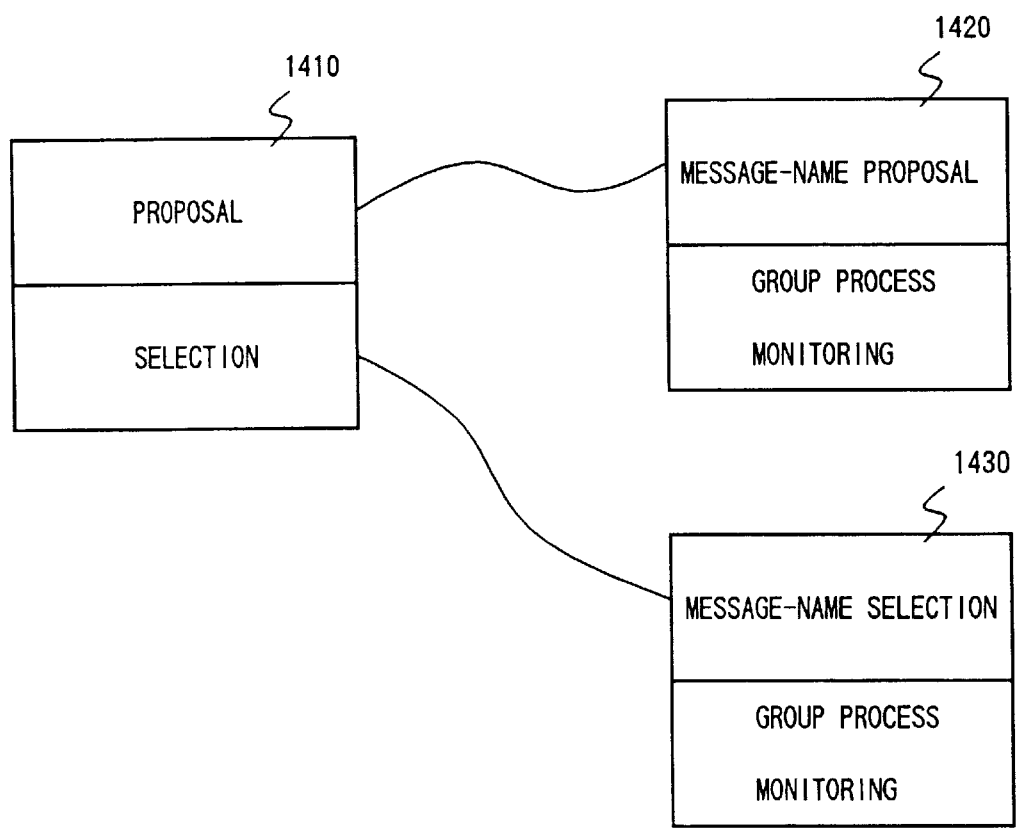
FIG. 14 is a diagram showing an example of description of composition request messages in the process management problem of FIG. 11.

FIG. 14 shows a description example of a composition request message 8 including a string of composition request commands 1420 and 1430.

Subsequently, description will be given of the processing flow in which the next processing is selected from the step 1110 of FIG. 11. First, for an execution control of processing related to the step 1110 of FIG. 11, a composition request message 8 is issued from the execution control section 9 (including programs executed under control thereof) to the knowledge harmonizing section 6. This resultantly initiates the knowledge harmonizing section 6. The contents of the composition request message 8 are described with a sequence of composition request commands as denoted by the reference numeral 1410 in FIG. 14. The knowledge harmonizing section 6 accomplished the following processing in accordance with the flowchart of FIG. 5. First, when the composition request message 8 is received in the step 5005, the following processing is achieved depending on the contents 1410 of the message 8. In the step 5010, a proposal message indicated by a numeral 1420 in FIG. 14 is acquired so as to conduct a proposal processing. Namely, a check is made to determine whether or not the harmonizing knowledge includes proposal-type knowledge belonging to the process monitoring group. Assuming that the description example of FIG. 13 is included in the contents of the harmonizing knowledge 52, the execution condition of the harmonizing knowledge 1350 is satisfied. However, if the mechanic or machine failure has not occurred, the execution condition is not satisfied and it is determined that there does not exist any proposal. Next, a selection message denoted by a reference numeral 1430 in FIG. 14 is again read in a step 5010 to achieve a selection processing according to the selection processing flowchart of FIG. 7. Namely, in the step 7005, selection-type knowledge belonging to the process monitoring group, in which the execution condition is satisfied, is selected. Assuming that the condition "finish process" is satisfied in this situation, the harmonizing knowledge 1310 is selected. Next, in the step 7010, element knowledge of the process monitoring group is activated. Namely, the element knowledge items 1210, 1220, and 1230 are activated. Subsequently, a negation processing is achieved in the step 7015. When the execution condition of the harmonizing knowledge 1340 is satisfied, the rescheduling cannot be selected. Thereafter, a modification processing is carried out in the step 7020. When the execution condition of the harmonizing knowledge 1330 is satisfied, the selection condition of the harmonizing knowledge 1310 selected in the step 7005 is modified. In the step 7030, depending on the magnitude of process delay, one of the element knowledge items 1210, 1220, and 1230 is selected for the next processing to be executed. When the step 1130 is selected, the processing selection is similarly executed to determine the processing to be executed in a sequential manner, thereby solving the problem. In this operation, if a substitution message is issued in place of the selection message 1420 in the composition request message 1410, the specified number of selection objects may possibly be selected such that the user 10 conducts the selection.

In the description of this embodiment, the execution control section 9 and the knowledge harmonizing section 6 are separated from each other. However, these sections may be combined with each other in a unit. In such a case, the composition request message 8 and the composition result knowledge 7 for the communications between the execution control section 9 and the knowledge harmonizing section 6 are unnecessitated.

According to the embodiment, since the system judges the situation thereof to select the next processing, the input of user's judgement can be dispensed with. Consequently, the load imposed onto the user is mitigated and it is possible for a user to achieve many process management operations at the same time.

Subsequently, description will be given of an embodiment where the present invention is applied to a problem in which the problem is described as a network (goal strategy network) including a set (goal object) of goals for executing the problem and a set (strategy object) of strategies for obtaining goals and generating lower-level goals.

Figure 15:
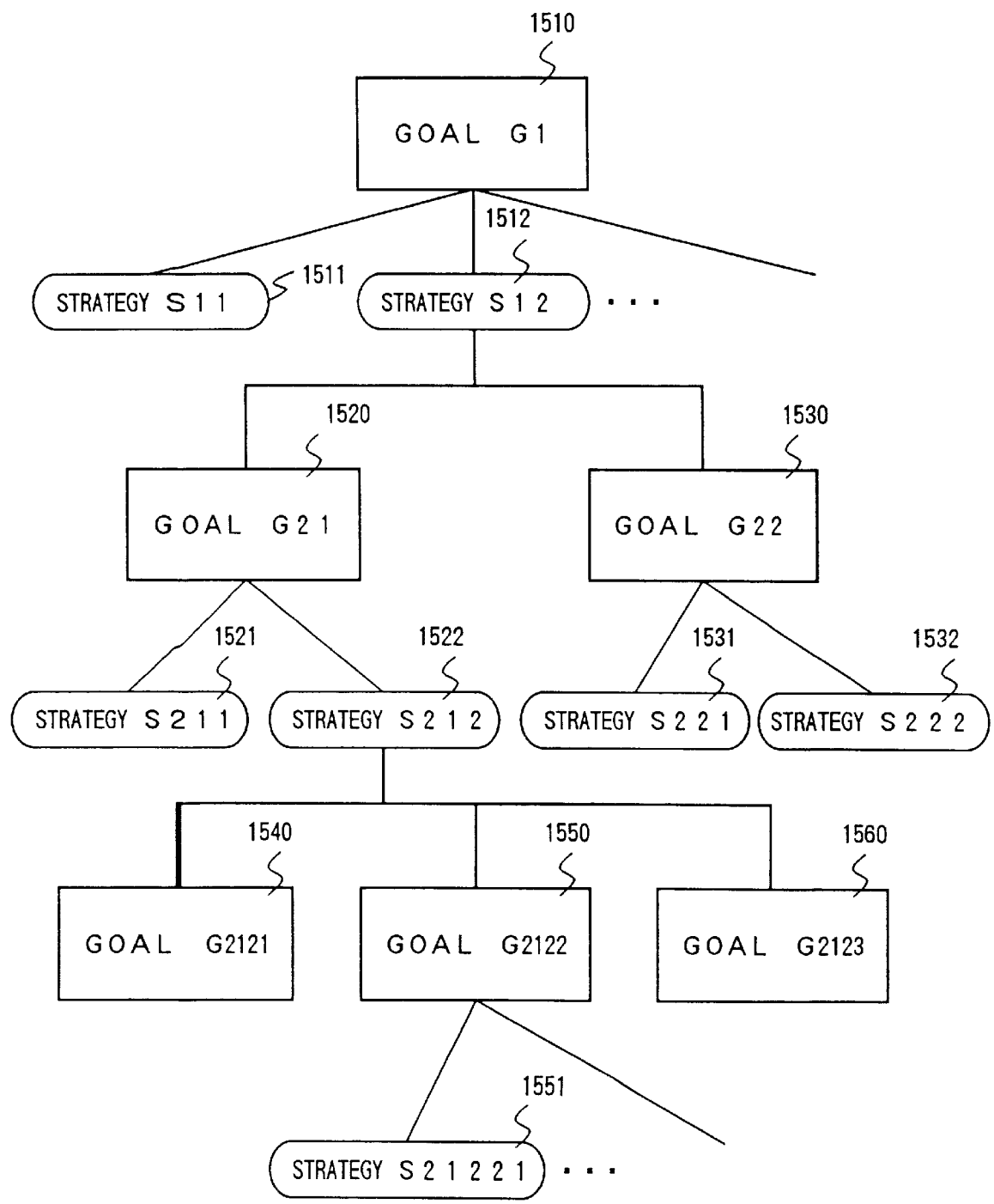
FIG. 15 is a diagram illustratively showing an example of an goal strategy network.

FIG. 15 is a diagram showing an outline of the goal strategy network. This diagram includes goal objects 1510, 1520, 1530, 1540, 1550, and 1560 in which goals to be attained for a solution of the problem are described and strategy objects 1511, 1512, 1521, 1522, 1531, 1532, and 1551 in which strategies (subdividing goals into lower-level goals and/or executing goals as procedures and rules) for obtaining goals are described. In FIG. 15, to attain a goal G1 1510, there are prepared a plurality of strategies such as S11 1511 and S12 1512. Assuming the strategy S12 1512 to have been selected, the strategy S12 1512 generates lower-level goals G21 1520 and G22 1530 for attaining the goal G1 1510. This means that after the goal G21 1520 is attained, the goal G22 1530 is obtained. Similarly, When the strategy S212 1522 is selected, there are produced lower-level goals G2121 1540, G2122 1550, and G2123 1560. Moreover, when the strategy S211 1521 is selected, since the strategy S211 1521 has rules and procedures for attaining the goal, these rules and procedures are executed for the goal without creating any lower-level goal.

Figure 16:
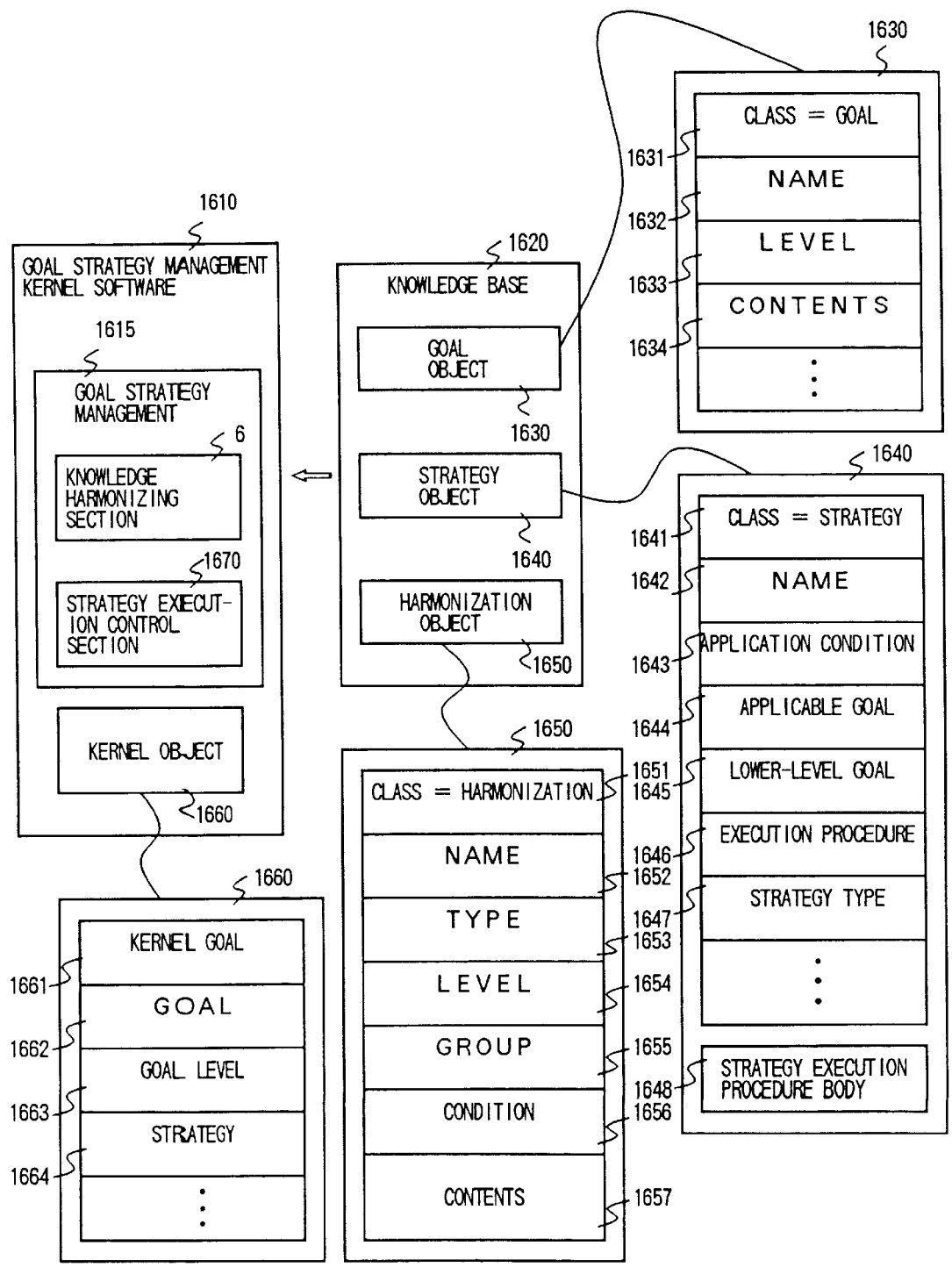
FIG. 16 is a diagram showing the structure of software for the problem represented by the goal strategy network.

FIG. 16 is a software configuration diagram used when the present invention is applied to the problem described in the form of a goal strategy network. The network includes a goal strategy managmenet kernel software 1610 for executing the problem described in the form of the goal strategy network. The software 1610 is constituted with a goal strategy managmenet section 1615 for controlling a goal strategy network, a knowledge harmonizing section 6 for setting an execution strategy through the strategy selection, modification, negation, and proposal so as to compose knowledge according to the present invention, a strategy execution control section 1670 for accomplishing the strategy execution, initiation, interruption, suspension, reinitiation, and termination, and a kernel object 1660 for controlling execution of the goal strategy network. The kernel object 1660 includes a kernel goal slot 1661 for controlling execution of the goal strategy control section 1615, a goal slot 1662 for storing therein a string of goals awaiting execution, a goal level slot 1663 for storing therein a goal level of the current processing, and a strategy slot 1664 for storing therein a strategy selected to attain each goal of the goal slot 1662. Moreover, there is disposed a knowledge base 1620 for storing therein knowledge for solving problems. The knowledge base 1620 is constituted with a goal object 1630, a strategy object 1640, and a harmonizing object 1650. The goal object 1630 includes a class slot (=goal) designating a type of the object, a name slot 1632 for storing therein a name of the object, a level slot 1633 to be loaded with a goal level, and a content slot 1634 for storing therein the contents of the object 1630. The strategy object 1640 is constituted with a class slot (=strategy) 1641, a name slot 1642, an application condition slot 1643 for storing therein a strategy application condition, an applicable goal slot 1644 for storing therein a name of an applicable goal, a lower-level goal slot 1645 for storing therein a name of a procedure to obtain the goal, a strategy type slot 1647 to be loaded with a strategy type, and a section 1648 for storing therein a strategy execution procedure body. The strategy type is specified as a deployment type for generating a lower-level goal, a procedure type for achieving a procedure, or a rule type for effecting a rule. The harmonizing object 1650 is formed with a class slot 1651 (=harmonizing), a name slot 1652, a type slot 1653, a level slot 1654, a group slot 1655, a condition slot 1656, and a content section 1657. These fields are loaded with the contents, which are respectively identical to the name, type, level, group, condition, and content fields 521 to 526 of FIG. 3. However, the type slot 1655 may be specified as a fusion or merger type in addition to those allowed for the items of the type slot 522. The group slot 1655 is loaded with a name of an applicable goal object when the type slot 1653 has a content of the proposal, selection, substitution, or merger type; with a name of an applicable strategy object when the type slot 1653 is specified as the modification type (level=data) or the negation type (level=deletion); or with a name of an applicable harmonizing object when the content of the type slot 1653 is the modification type (level=proposal or selection) or the negation type (level=selection).

Figure 17:
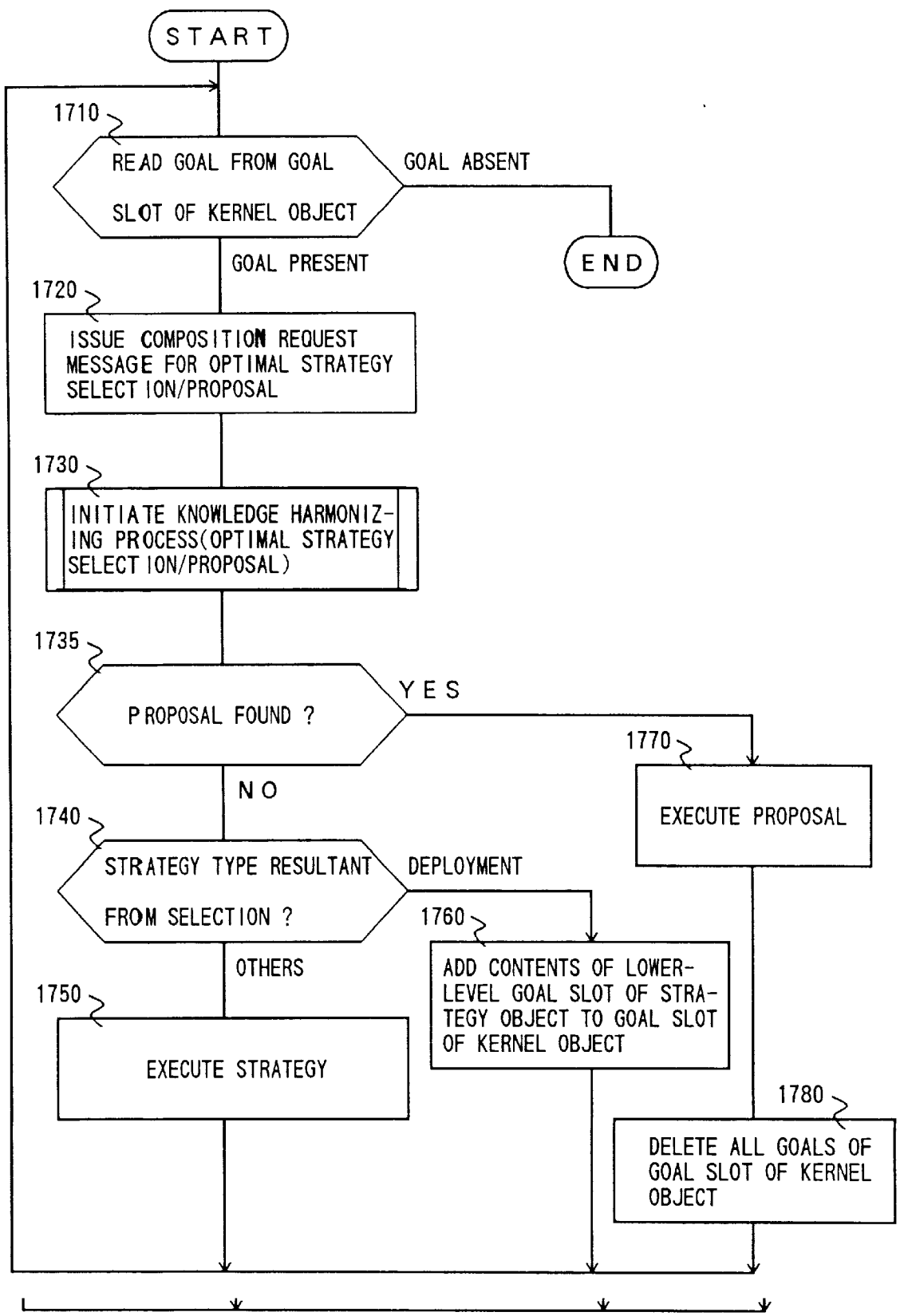
FIG. 17 is a flowchart showing the general processing of the goal strategy management.

FIG. 17 shows a general flowchart of the processing to be executed by the goal strategy management 1615. In a step 1710, the execution awaiting goal string stored in the goal slot 1662 of the kernel object 1660 is accessed to sequentially acquire goals in the goal-by-goal manner. If the goal is missing in the slot 1662, the processing is terminated. Subsequently, in a block 1720, a composition request message 8 is issued for a strategy selection. The composition request message 8 of this operation is the same as that shown in FIG. 4. In a block 1730, the knowledge harmonizing processing is then initiated to request generation or selection of a proper strategy. The contents of the knowledge harmonizing processing are identical to those shown in FIGS. 5 to 10. However, when the merger type is specified, a plurality of strategies are selected to merge portions of the contents (lower-level sub-goals) of the respective strategies with each other. Moreover, when the strategy is of the deployment type (for generating a lower-level sub-goal), the lower-level sub-goals which are unnecessitated as negation knowledge (level=deletion) depending on the situation are described in the content field 1657, thereby deleting the described sub-goals from the strategy. In addition, a deletion flag may possibly be set to a sub-goal to be deleted such that the sub-goal is removed from the strategy deployment (step 1760). Subsequently, in a step 1735, a check is made to decide whether or not proposal knowledge has been proposed from the knowledge harmonizing section 6. If this is the case, the contents proposed are executed in a step 1770. Thereafter, in a step 1780, all the remaining goals stored in the goal slot 1662 of the kernel object 1660 are deleted, thereby terminating the processing. If the proposal is missing in the step 1735, a step 1740 is executed to judge the value of the strategy type slot 1647 of the selected strategy object 1640. If the strategy type slot 1647 denotes the deployment type, the lower-level goal slot 1645 is added to the goal slot 1662 of the kernel object 1660 in a step 1760. In this operation, if a portion of the lower-level sub-goal has been deleted or skipped, only the sub-goals not having deleted or skipped are added to the goal slot 1662. In the step 1740, if the value of the strategy type slot 1647 denotes a type other than the deployment type, the strategy is executed in a step 1750.

In this example, the knowledge harmonizing processing is initiated only in the step 1730; however, the contents of the composition request message 8 may be subdivided so as to achieve a plurality of initiations of the processing. For example, in order to carry out the negation processing for the deletion of the lower-level sub-goals before the step 1760, the knowledge harmonizing processing may be initiated for execution thereof.

Figure 18:
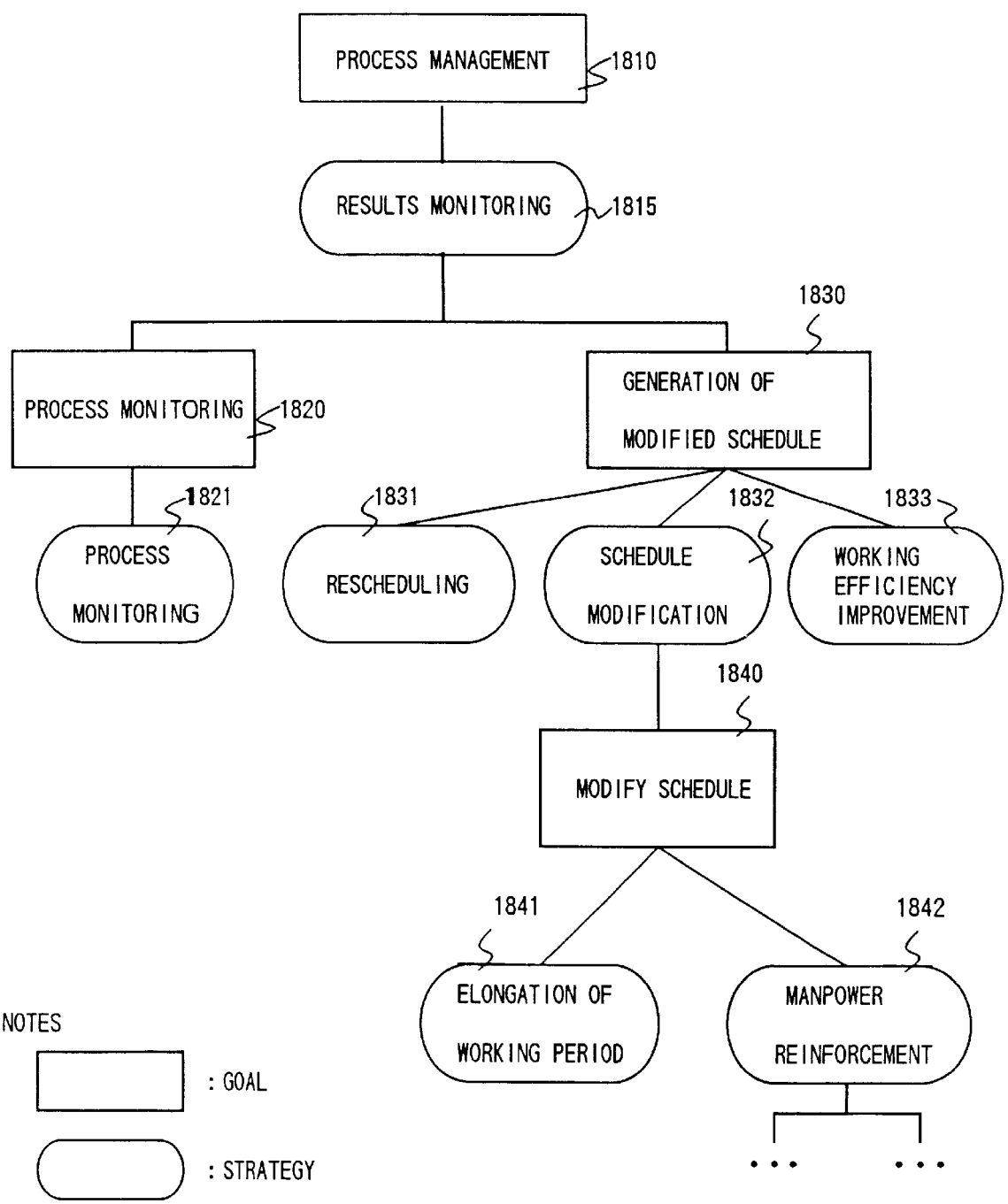
FIG. 18 is a schematic diagram showing an example in which the process management problem of FIG. 11 is described in the form of a goal strategy network.
Figure 19:
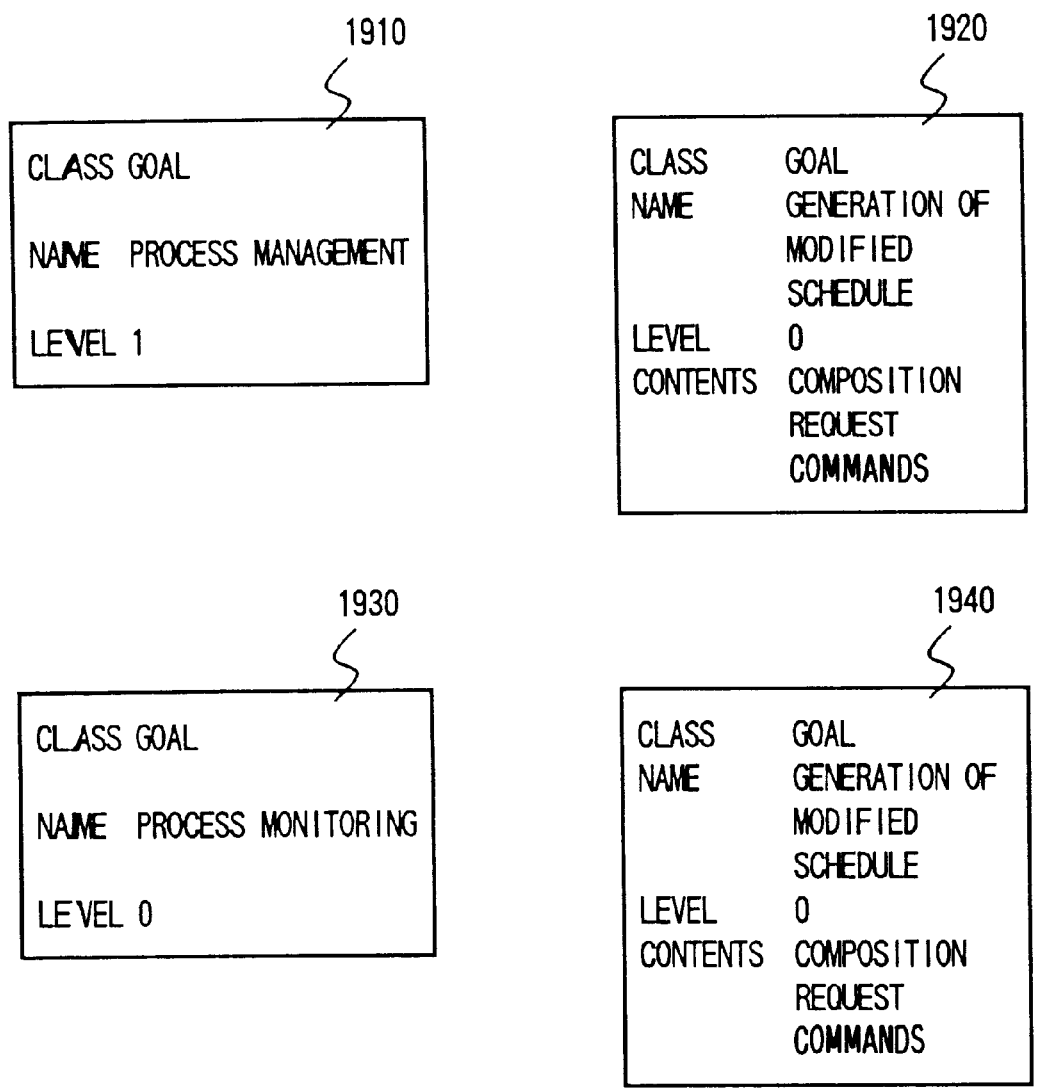
FIG. 19 is a diagram showing an example of the goal object description in the problem of FIG. 18.

FIG. 18 shows an example in which the process management problem of FIG. 11 is described in the form a goal strategy network and FIGS. 19 to 21 show a goal object description example, a strategy object description example, and a harmonizing object description example, respectively.

In FIG. 18, a process management 1810 is a goal of the highest level. To attain the goal, a results monitoring strategy 1815 is prepared. FIG. 19 includes the contents of the goal object description 1910 of the process management 1810. FIG. 20 includes the contents of the strategy object description 2010 of the results monitoring strategy 1815. Since strategy type slot of the strategy object 2010 is specified as the deployment type, the strategy object 2010 creates as lower-level goals a process monitoring 1820 and a generation of modified schedule 1830. For the contents of an object description 1920 of the generation of modified schedule 1830, a composition request message 8 for a strategy selection is described in its content slot. The contents to be described are the same as those shown in FIG. 14. The other goals and strategies are also described in the similar manner. In this example, the description examples of the strategies 1833, 1841, and 1842 are omitted.

FIG. 21 shows a description example of the harmonizing object 1650. Since the contents to be described are identical to those of FIG. 13, a detailed description thereof will be avoided.

Next, according to the flowchart of FIG. 17, description will be given of the operation of solving the processing control problem of FIG. 18. Assume that the highest-level goal i.e. the process management 1810 is beforehand stored in the goal slot 1662 of the kernel object 1660. First, in the step 1710, a goal is acquired from the goal slot 1662 of the kernel object 1660. The process management 1810 is read therefrom in this case. Next, in the step 1720, since only one goal 1810 is to be processed, control is passed through the steps 1720 and 1730 to the step 1740 so as to check the type of the strategy 1815. However, if the goal object 1910 has a content slot loaded with a composition request message, the knowledge harmonizing processing is initiated. If modification knowledge is loaded, the modification processing is achieved. Since the deployment type is specified for the strategy 1815, the lower-level goals of the goal object 1910 (i.e. process monitoring and generation of modified schedule) are added to the goal slot 1662 of the kernel object 1660. Subsequently, returning to the step 1710, the "process monitoring goal" thus added in the step 1760 is read therefrom. Since the process monitoring 1820 includes only the process monitoring strategy 1821, if the strategy is of the procedure type, a procedure stored in the execution procedure slot 1646 is executed. Next, the goal 1830 is read therefrom in the step 1710. Since the content slot of the goal object 1920 of the goal 1830 includes a description of a composition request message, the composition request message is issued in the step 1720. The knowledge harmonizing section 6 is initiated in the step 1730 to accomplish the knowledge harmonizing processing such that a strategy resultant from the composition is produced from the knowledge harmonizing processing. The processing contents of the knowledge harmonizing processing is the same as those used when the composition request message 1410 of FIG. 14 is issued in the problem of FIG. 11. Thereafter, the type of the strategy received from the knowledge harmonizing section 6 is similarly checked in the step 1740 so as to conduct processing based on the type. The processing above is repeatedly achieved for all goals read in the step 1710. In accordance with the embodiment, the problem can be described with objects and hence there is obtained an advantageous effect that the alteration and addition of processing are facilitated.

Description will now be given of an embodiment in which the present invention is applied to a restoration schedule producing system (train regulation system) to be used when a train operation state or condition is disturbed.

Figure 22:
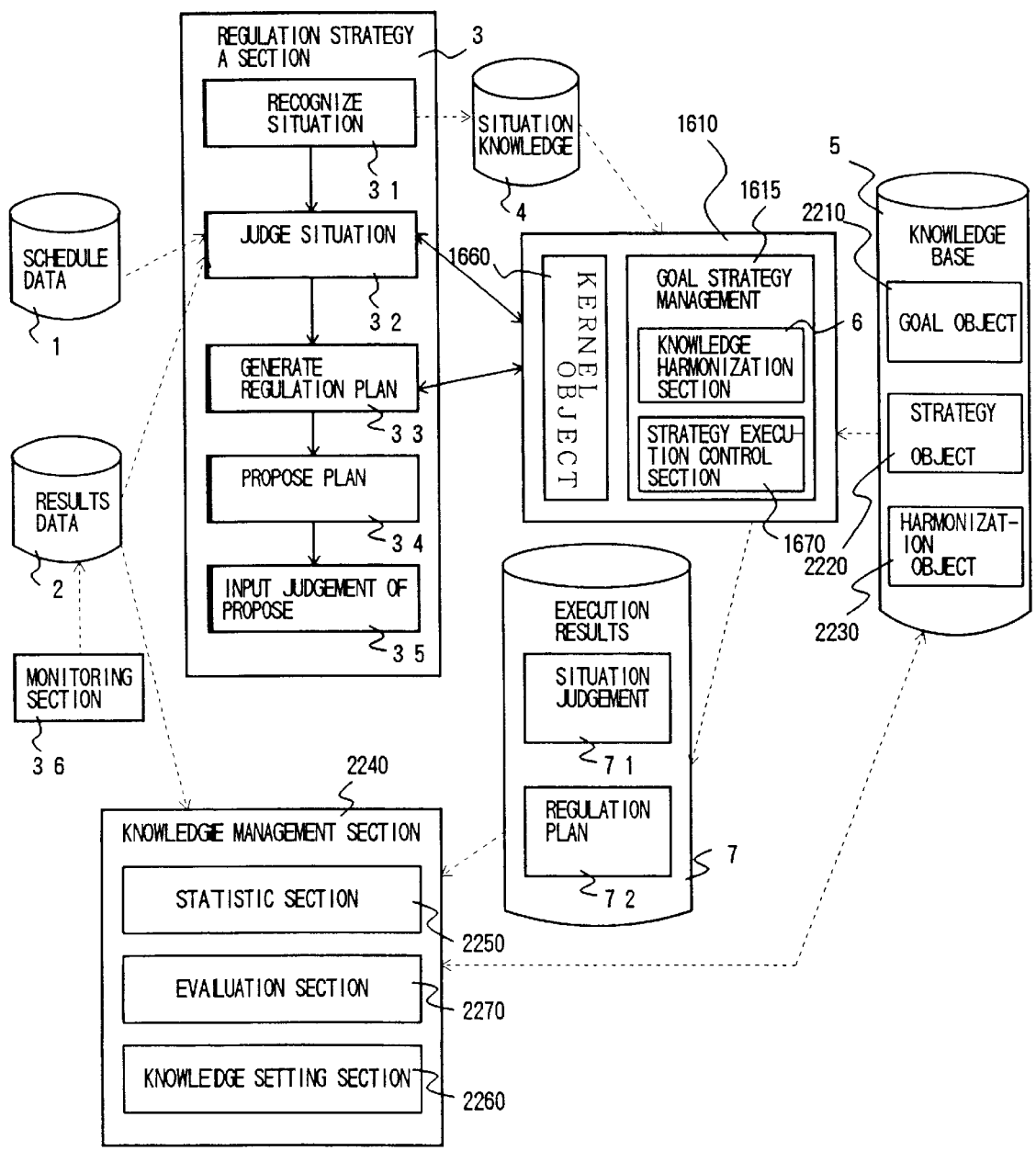
FIG. 22 is a diagram showing the overall constitution of software used in an train regulation system.

FIG. 22 is the overall configuration diagram of the train regulation system. This diagram includes schedule data 1 formed by accumulating schedule data items (of train schedule diagrams), a monitoring section for monitoring results (train operation states or situations) 36 of the system operation depending on the schedule, and results data 2 created by accumulating operation results monitored by the monitoring section. There is also included a regulation strategy basic section 3 for controlling based on the schedule data 1 and the results data 2 the train operations according to the schedule data 1. The regulation strategy basic section 3 is constituted with a situation recognition section 31 for recognizing situations of system operations according to the contents of the schedule data 1 and the results data 2, a situation judgement section 32 for determining based on the system operation situations attained by the situation recognition section 31 whether or not the system is operating on schedule and whether or not any disturbance appears in the schedule, a regulation plan generating section 33 for generating, when the situation judgement section 32 determines that a disturbance appears in the schedule, a regulation plan to operate the system on schedule, a regulation plan proposal section 34 for displaying on the display device 23 the regulation plan generated by the regulation plan generating section 33 so as to propose the regulation plan to the user, and a proposal judgement input section 35 to be operated by the user to input contents of judgement conducted on the proposed result. Arrow marks between the respective constituent components indicate the representative execution sequence in the operation control processing. However, the execution order may be changed depending on the contents of the knowledge base 5. The configuration also includes situation knowledge 4 storing therein the system operation situations attained by the situation recognition section 31 and a knowledge base 5 for storing therein knowledge for the system to judge situations and knowledge to produce regulation plans. The knowledge base is constituted with a goal object 2210, a strategy object 2220, and a harmonizing object 2230. The constitutions of these objects are the same as those of the goal object 1630, the strategy object 1640, and the harmonizing object 1650 shown in FIG. 16. The system further includes a goal strategy management kernel software 1610 constituted with a goal strategy management 1615, a kernel object 1660, a knowledge harmonizing section 6, and a strategy execution control section 1670. The configuration comprises execution result section 7 storing therein results of execution of the goal strategy management kernel software 1610. The execution result section 7 is constituted with a situation judgement section 71 formed with results of execution of the situation judgement section 32 and an regulation plan section 72 constructed with results of execution of the regulation plan generating section 33. In this constitution, a knowledge management section 2240 achieving harmonizing object addition and modification and statistic operations on results data includes a statistic section 2250 for achieving statistic operations on the results data, an evaluation section 2270 for evaluating results of execution of the regulation plans, and a knowledge setting section 2260 for displaying statistic results from the statistic section 2250 and evaluation results from the evaluation section 2270 and achieving the modification and addition of the contents of the harmonizing knowledge 52.

FIG. 23 is a diagram showing the system configuration implementing the train regulation system of FIG. 22. This system includes monitor sensors 26 disposed in the respective facilities (stations) for monitoring the system operation situations, communication cables 27 for transmitting data sampled by the monitor sensors 26, a central processing unit 21 to be loaded with a monitoring section 35 for gathering facility data (such as train arrival and departure points of time attained in the facilities) received via the communication cables 27, the regulation strategy basic section 3, the goal strategy management kernel software 1610, and a knowledge management section 2240, and a storage device 22 for storing therein the schedule data 1, the results data 2, the situation knowledge 4, the knowledge base 5, and execution results 7. The system further comprises a display device 23 for displaying thereon situations of the system operation and control plans (train regulation plans) and a keyboard 24 and a mouse 25 for inputting instructions from the users to the system.

Figure 24:
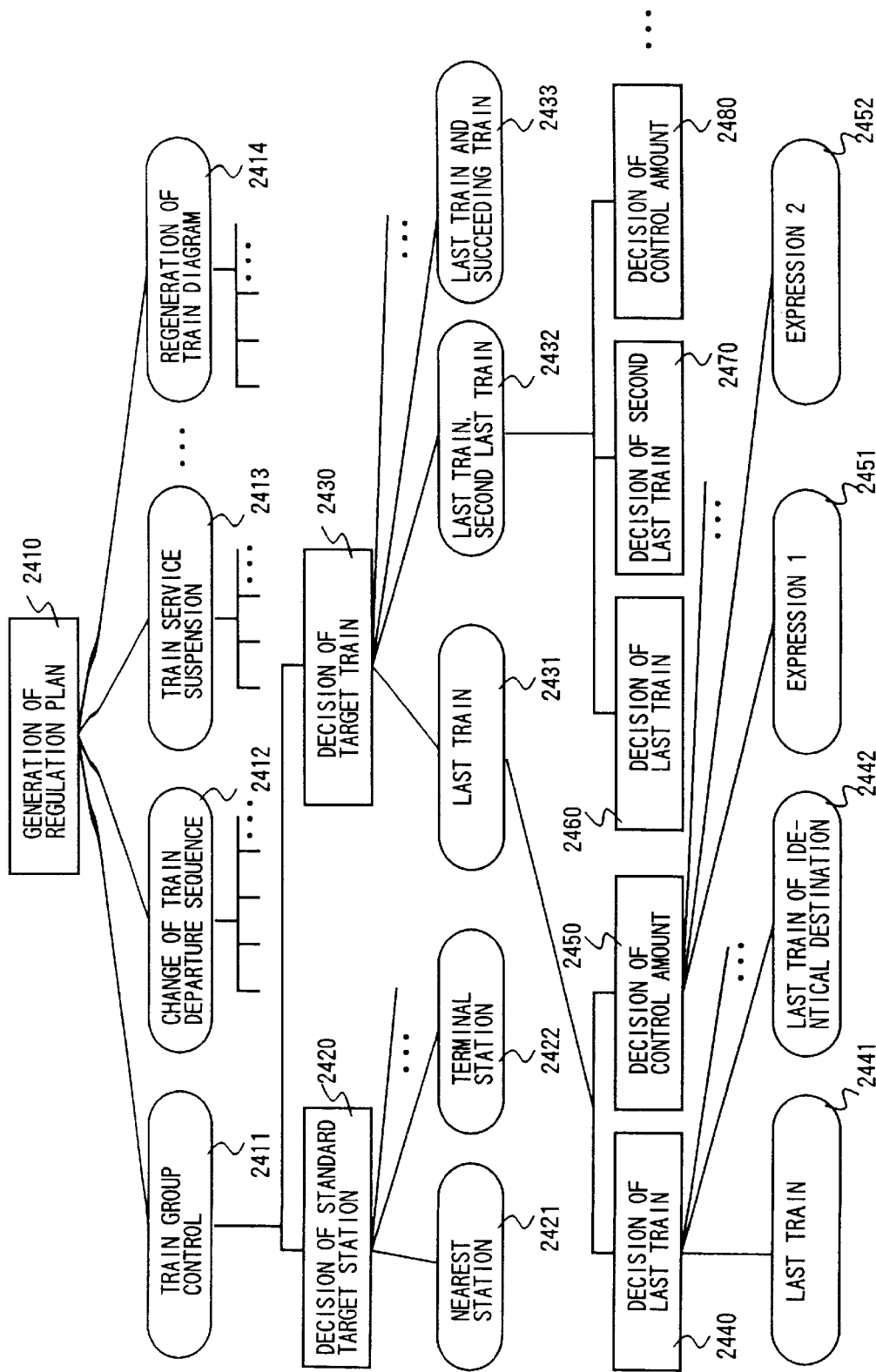
FIG. 24 is a schematic diagram showing an example in which a regulation plan generating section of the train regulation system is described in the form of a goal strategy network.

FIG. 24 is a description example in which the contents of the regulation plan generating section 33 are described in the form of the goal strategy network. The regulation plan generating section 33 includes a generation of regulation plan 2410 as the highest-level goal. In order to achieve the goal 2410, there are disposed various strategies such as a train group control 2411, a change of train departure sequence 2412, a train service suspension 2413, and a regeneration of train diagram 2414.

Referring now to FIG. 25, description will be given of the train group control 2411, the change of train departure sequence 2412, and the train suspension 2413.

FIG. 25 shows a screen example used in the train regulation. This diagram includes stations a to e where the trains are started and stopped. The abscissa stands for the lapse of time, and lines denoted in association with trains 251, 252, 253, and 254 are used to represent points of time when the respective trains pass the stations a to e. The bold lines denote that the actual train operations and arrivals at stations, the fine lines represents the train operation schedules and the broken line designates a change effected in the schedule. A small circle associated with the station c for the train 254 indicates that the train 254 starts from the station c. For the arrival time of the train 253 at the station d, the bold line is delayed in time as compared with the fine line. This indicates that the arrival of the train 253 at the station d has been delayed. When the arrival of the train 253 at the station d is delayed, the interval between the running trains 252 and 253 is increased. Consequently, it is forecasted that the delay of the train 252 grows as the train 252 passes through the stations c, b, etc. To prevent the delay of the train 252 from increasing as above, the departure of the train 252 from the station c is delayed, for example, as denoted by the broken line. As a result, the intervals between the trains 251, 252, and 253 are uniformalized, thereby preventing the occurrence of the considerable delay of the train 253. The control operation above is achieved under the train group control. The change of train departure sequence is conducted as follows, for example. When the arrival of the train 253 at the station d is further delayed such that the arrival time thereof at the station c becomes to be after the schedule departure time of the train 254 from the station c, the train regulation is accomplished so that the train 254 starts from the station c before the delayed arrival of the train 253 thereat. Moreover, the train service suspension means that, for example, the operation of the train 254 is suspended in the situation above. Referring now to FIG. 24, description will be given in detail of an example of the goal strategy network in the train group control. The train group control strategy 2411 first generates the lower-level goals i.e. a decision of standard target station 2420 and a decision of target train 2430. The decision of standard target station 2420 decides a station where an execution of the train group control is started, for example, the station c of FIG. 25. In this case, there may be used various strategies, for example, a strategy 2421 in which the nearest station is set as the standard target station and a strategy 2422 in which a terminal station (where the train returns to the starting station) is set as the standard target station. Furthermore, the decision of target train 2430 determines a train of which the operation schedule is to be adjusted, for example, the train 252 of FIG. 25. In this case, there may be adopted strategies, for example, a strategy 2431 in which the last train with respect to the delayed train is adjusted, a strategy 2432 in which two trains i.e. the last train and the second last train of the delayed train are adjusted, and a strategy 2433 in which two trains last train and succeeding train of the delayed train are adjusted. The last train strategy 2431 creates the lower-level goals such as a decision of last train 2440 and a decision of control amount 2450. The decision of last train 2440 is associated with, for example, a strategy 2441 for adjusting the last train and a strategy 2442 for adjusting the last train of which the destination is identical to that of the delayed train. Moreover, the decision of control amount goal 2450 is related to an expression 1 execution strategy 2451, an expression 2 execution strategy 2451, and the like. In addition, when the strategy 2432 is selected, there are produced lower-level goals such as a decision of last train 2460, a decision of second last train 2470, and a decision of control amount 2480. FIG. 26 shows a description example of harmonizing knowledge in the train regulation. An example of proposal knowledge 2610 is used for storing therein, when a train X is repeatedly delayed almost every day and substantially identical train regulation plan is proposed for each delay, the delay contents and the train regulation plans for the train X. The proposal knowledge 2610 is executable when the generation of regulation plan 2410 of FIG. 24 is accomplished. When the proposal knowledge 2610 is executed, the train regulation plan of the proposal knowledge 2610 is directly proposed without achieving any intermediate reasoning. An example of negation knowledge 2620 having the deletion level is adopted to delete, in a case where if a train running in the opposite direction is also delayed when the strategy 2432 of FIG. 24 is selected, the lower-level goal 2470. An example of modification knowledge 2630 at the proposal level is employed to modify, in a case where an unusually large number of passengers are present when the proposal knowledge 2610 is selected, the contents of the proposal knowledge 2610. An example of modification knowledge 2640 at the data level is disposed to modify, in a case of a selection of the strategy 2451 where the adjustment target train is already controlled in advance, the contents of the expression 1.

FIG. 27 is a screen example for setting strategy and harmonizing objects in the knowledge setting section 2260 by use of the display device 23, the keyboard 24, and the mouse 25. This diagram includes a window 270 on the display device device 23, a menu display area 271 for displaying menus prepared for various operations, a sub-menu display area 272 to be presented when setting harmonizing knowledge, and an area 273 for displaying therein a goal strategy network.

Figure 28:
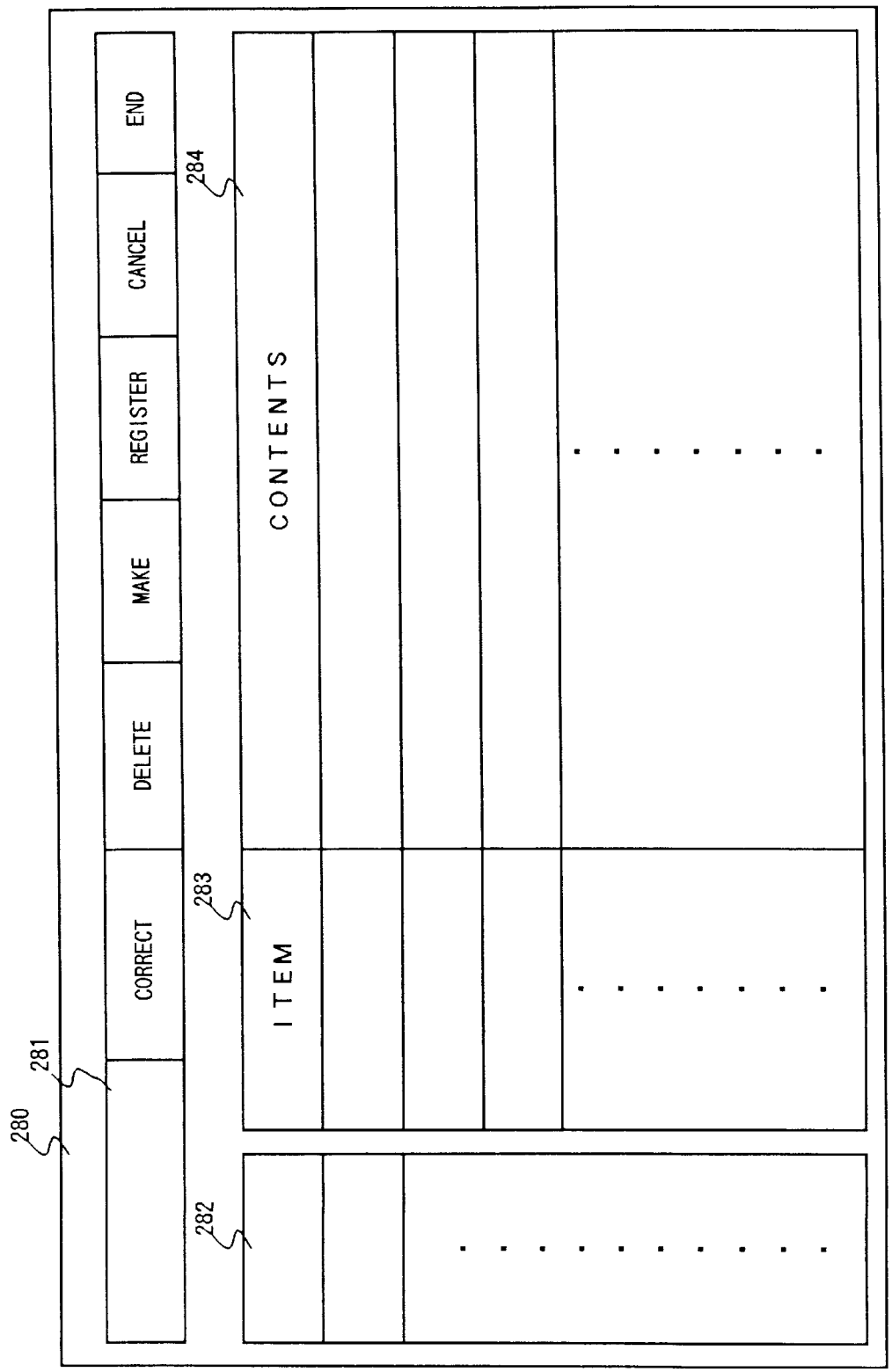
FIG. 28 is a diagram showing an example of a harmonizing object setting screen (selection type).

FIG. 28 shows a screen example adopted to set selection knowledge. The screen configuration includes a window 280 on the display 23, a menu display area 281, a list display area 282 for displaying therein harmonizing knowledge in the form of a list, an item display area 283 for displaying therein items of harmonizing knowledge to be set, and a content display area 284 in which the contents of harmonizing knowledge are to be displayed.

Next, the operation of the system above will be described in accordance with the flowchart of the regulation strategy basic section 3 shown in FIG. 22. The situation recognition section 31 first checks the contents of the schedule data and the results data to determine if any delay is found in the actual train operation so as to create the current operation situation knowledge 4. Next, the situation judgement section 32 checks to determine whether or not an train regulation is necessary for the contents of the delay thus detected. In this situation, if the contents of the situation judgement section 32 have been described in the form of a goal strategy network, the goal strategy management kernel software 1610 is initiated for execution. Since the operation contents of the goal strategy management kernel software 1610 are as described in FIG. 17, the problem is solved according to the contents of the goal object 2210, the strategy object 2220, and the harmonizing object 2230 stored in the knowledge base 5. After the operation of the situation judgement section 32 is finished, the regulation plan generation section 33 initiates the goal strategy management kernel software 1610. The goal strategy management kernel software 1610 produces a regulation plan based on, for example, knowledge shown in FIGS. 24 and 26. The regulation plan proposal section 34 presents the generated train regulation plan on the display device 23 and corrects, in response to a correction instructed by the user from the keyboard 24 or mouse 25, correction items thus specified, thereby indicating necessity or unnecessity of execution of the presented train regulation plan. The proposal judgement input section 25 inputs judgement of the user for necessity or unnecessity of execution of the train regulation plan. If the execution is determined to be necessary or unnecessary, the proposal judgement input section 25 issues an execution instruction to the facility or instructs the regulation plan generating section 33 to create another train regulation plan, respectively. Moreover, the statistic section 2240 is initiated for execution each time a train regulation plan is produced. The statistic section 2240 reads information about delayed trains, delay amounts thereof, etc. from the results data 2 and the contents and the like of the train regulation plan from the execution results storage 7 so as to generate statistic data such as a delay count and a delay magnitude for each train. The evaluation section 2270 collects execution results of the train regulation plan from the results data 2 to evaluate the train regulation plan. The knowledge setting section 2260 is initiated in response to a request from the user to present on the display device 23 the contents of the harmonizing object 2230 and statistic results from the statistic section 2250 and evaluation results from the evaluation section 2270 and to achieve operations such as a correction of the contents of the harmonizing object 2230 and an addition thereto respectively according to a content correction request and an addition request for the harmonizing object 2230.

Referring now to FIGS. 27 and 28, description will be given of an example where a harmonizing object (of the selection type) is established in the knowledge setting section 2260.

(1) When a correction of contents of an object is requested from the user, the screen example of FIG. 27 is presented on the display device 23.
(2) The user picks by the mouse 25 the menu item "set harmonizing knowledge" in the menu display area 271.
(3) When setting harmonizing knowledge, the system displays in the sub-menu display area 272 the types of harmonizing knowledge to be set. The user picks a desired type e.g. "selection" in the submenu display area 272.
(4) For specifying a group of knowledge to be set, the user picks a goal or strategy displayed in the goal strategy network display area 273. For example, when setting harmonizing knowledge (of the selection type), the user picks "goal i".
(5) If it is desired to conduct a scrolling of the contents of the goal strategy network display area 273, the user picks by the mouse 25 the menu item "scroll" in the menu display area 271 shown in FIG. 27 and then picks a goal or strategy in the goal strategy network display area 273. As a result, the contents of the goal strategy network display area 273 is subjected to the scrolling such that the picked goal or strategy is presented in the central position.
(6) When a group is specified, names of harmonizing objects related to the specified type and group are presented in a list format in the list display area 282 of FIG. 28.
(7) For correcting a harmonizing object, the user picks by the mouse 25 the menu item "correct" in the menu display area 281 and then picks again a name of a harmonizing object to be corrected in the list display area 282. In response thereto, detailed contents of the specified harmonizing object are presented in the item display area 283 and the content display area 284.
(8) The user picks by the mouse 25 a name of an item to be corrected and then inputs correction contents in the content display area 284 from the keyboard 24.

Setting of a strategy is also achieved in the similar manner as described above.

According to the embodiment, for a train which is repeatedly delayed almost every day, the train regulation plans for such delay occurrences are stored in the system such that an appropriate train regulation plan can be proposed when necessary without achieving any reasoning operation. In consequence, the proposal processing can be executed at a high speed and the load imposed onto the user can be mitigated.

As described above, the following advantageous features are obtained according to the present invention,
(1) An appropriate solution plan can be proposed in association with the system features and the schedule characteristics.
(2) A control plan can be proposed depending on the system execution conditions or situations.
(3) Since problems which may repeatedly appear in the system and methods of solving the problems are memorized as knowledge so as to be proposed later when necessary, the reasoning need not be conducted each time such a problem takes place and hence the proposal processing can be achieved at a high speed.
(4) Based on a system situation and the contents of a problem, it is possible to automatically propose a problem solving plan. In consequence, the user's judgement for decision of a proper problem solving plan can be dispensed with, thereby reducing the operation load imposed onto the user.
(5) Knowledge employed to judge a problem solving method and a problem control method can be automatically corrected and altered and hence a comprehensive judgement can be conducted.
(6) Since knowledge is described with objects, when inconsistency, which is related to portions of knowledge, occurs between knowledge depending on situations, only the knowledge portions of the inconsistency can be deleted. Namely, the inconsistency can be easily removed.
(7) For knowledge including portions which cannot be executed depending on conditions, only the conditions and the portions can be described as negation knowledge. Consequently, it is unnecessary to prepare a large number of similar knowledge, which minimizes the storage capacity of the computer system.
(8) When a system characteristic is changed, there can be accomplished addition and correction of knowledge necessary to judge the situation, thereby improving the system maintainability.
(9) When a plurality of guidelines are selectable at the same time, the number of selection items can be reduced so that the user executes a judgement input. This mitigates the load imposed onto the user.

While particular embodiments of the invention have been shown and described, it will be obvious to those skilled in the art that various changes and modifications may be made without departing from the present invention in its broader aspects.

We claim:
1. A problem solving method comprising the processing steps of:
storing element knowledge each represented as a data block for denoting a goal or a subgoal or a strategy hierarchically organized for problem solving, plan generation and user guiding;
setting harmonizing knowledge represented as a data block for selecting and/or changing the element knowledge;
storing each content of the harmonizing knowledge in a memory called a slot;
selecting and/or changing the element knowledge in accordance with the contents of the harmonizing knowledge; and
executing a plan generation and a problem solving by use of the element knowledge thus selected and/or changed;

wherein said selecting and/or changing the element knowledge processing step comprises the processing steps of:
modifying the contents of the element knowledge,
deleting portions of the contents of the element knowledge, and
removing particular element knowledge from the selected element knowledge.

2. A problem solving method according to claim 1, wherein each of the harmonizing knowledge of said setting processing step includes a name slot denoting a name for discrimination between a plurality of harmonizing knowledge.

3. A problem solving method according to claim 1, wherein each of the harmonizing knowledge of said setting processing step includes a type slot denoting a type of the harmonizing knowledge for a representation thereof.

4. A problem solving method according to claim 1, wherein each of the harmonizing knowledge of said setting processing step includes a level slot denoting a detailed type of the harmonizing knowledge for a representation thereof.

5. A problem solving method according to claim 1, wherein each of the harmonizing knowledge of said setting processing step includes a group slot denoting a classification of an object for use of the harmonizing knowledge for a representation thereof.

6. A problem solving method according to claim 1, wherein said executing processing step includes the processing step of:
proposing via an input/output device a result attained by achieving a reasoning on a method of solving the problem; and
inputting via the input/output device a result of judgment conducted by a user on the proposed reasoning result.

7. A problem solving method according to claim 1, wherein the element knowledge is described in the form of a goal strategy network representing a set having a network structure, and
wherein the set including goal objects of knowledge such as a goal to be attained for a problem solution and lower-level subgoal and strategy objects of knowledge such as procedures and rules which are employed to subdivide the goal and the lower level subgoals into lower subgoals for achieving the goal and to directly obtain the goal without subdividing the goal.

8. A problem solving method comprising the processing steps of:
storing element knowledge each represented as a data block for denoting a goal or a subgoal or a strategy hierarchically organized for problem solving, plan generation and user guiding;
setting harmonizing knowledge represented as a data block for selecting and/or changing the element knowledge;
storing each content of the harmonizing knowledge in a memory called a slot;
selecting and/or changing the element knowledge in accordance with the contents of the harmonizing knowledge; and
executing a plan generation and a problem solving by use of the element knowledge thus selected and/or changed,
wherein a problem to be solved is that when a plan is distributed, the plan is to be restored as soon as possible and
wherein the element knowledge is knowledge for restoring the plan.

9. A problem solving method comprising the processing steps of:
storing element knowledge each represented as a data block for denoting a goal or a subgoal or a strategy hierarchically organized for problem solving, plan generation and user guiding;
setting harmonizing knowledge represented as a data block for selecting and/or changing the element knowledge;
storing each content of the harmonizing knowledge in a memory called a slot;
selecting and/or changing the element knowledge in accordance with the contents of the harmonizing knowledge; and
executing a plan generation and a problem solving by use of the element knowledge thus selected and/or changed;
wherein said selecting and/or changing element knowledge processing step includes a processing step of selecting a plurality of strategy objects and combining lower-level subgoals of the respective strategy objects with each other.

10. A problem solving method comprising the processing steps of:
storing element knowledge each represented as a data block for denoting a goal or a subgoal or a strategy hierarchically organized for problem solving, plan generation and user guiding;
setting harmonizing knowledge represented as a data block for selecting and/or changing the element knowledge;
storing each content of the harmonizing knowledge in a memory called a slot;
selecting and/or changing the element knowledge in accordance with the contents of the harmonizing knowledge; and
executing a plan generation and a problem solving by use of the element knowledge thus selected and/or changed;
wherein said selecting and/or changing the element knowledge processing step includes a processing step of deleting or skipping portions of the lower-level subgoals.

11. A problem solving method comprising the processing steps of:
storing element knowledge each represented as a data block for denoting a goal or a subgoal or a strategy hierarchically organized for problem solving, plan generation and user guiding;
setting harmonizing knowledge represented as a data block for selecting and/or changing the element knowledge;
storing each content of the harmonizing knowledge in a memory called a slot;
selecting and/or changing the element knowledge in accordance with the contents of the harmonizing knowledge; and
executing a plan generation and a problem solving by use of the element knowledge thus selected and/or changed;
wherein said harmonizing knowledge of said setting processing step includes knowledge having descriptions of contents of problems which may repeatedly appear in the system and contents of methods of solving the problems and of knowledge formed with descriptions of disturbances which may repeatedly appear in the system and of causes, situations, and restoring means of disturbances unique to a system as a control object.

12. A problem solving method comprising the processing steps of:

storing element knowledge each represented as a data block for denoting a goal or a subgoal or a strategy hierarchically organized for problem solving, plan generation and user guiding;

setting harmonizing knowledge represented as a data block for selecting and/or changing the element knowledge;

storing each content of the harmonizing knowledge in a memory called a slot;

selecting and/or changing the element knowledge in accordance with the contents of the harmonizing knowledge; and executing a plan generation and a problem solving by use of the element knowledge thus selected and/or changed;

wherein said executing processing step includes a processing step for detecting occurrences of disturbances which may repeatedly appear in the system and occurrences of disturbances unique to a system as a control object and proposing restoring means stored in the harmonizing knowledge.

13. A problem solving method comprising the processing steps of:

storing element knowledge each represented as a data block for denoting a goal or a subgoal or a strategy hierarchically organized for problem solving, plan generation and user guiding;

setting harmonizing knowledge represented as a data block for selecting and/or changing the element knowledge;

storing each content of the harmonizing knowledge in a memory called a slot;

selecting and/or changing the element knowledge in accordance with the contents of the harmonizing knowledge; and executing a plan generation and a problem solving by use of the element knowledge thus selected and/or changed, wherein said setting harmonizing knowledge processing step includes a processing step of displaying a goal strategy network connecting a plurality of goals and strategies and displaying in response to a specification of a goal or strategy a list of names of harmonizing knowledge related to the goal or strategy.

14. A problem solving method according to claim 13 wherein said setting harmonizing knowledge processing step includes the processing steps of:

specifying one of the goals or strategies; and specifying a name of harmonizing knowledge presented in the harmonizing knowledge name list.

15. A problem solving method comprising the processing steps of:

storing element knowledge each represented as a data block for denoting a goal or a subgoal or a strategy hierarchically organized for problem solving, plan generation and user guiding;

setting harmonizing knowledge represented as a data block for selecting and/or changing the element knowledge;

storing each content of the harmonizing knowledge in a memory called a slot;

selecting and/or changing the element knowledge in accordance with the contents of the harmonizing knowledge; and executing a plan generation and a problem solving by use of the element knowledge thus selected and/or changed, wherein said setting harmonizing knowledge processing step includes a processing step of displaying, in response to a specification of a name of harmonizing knowledge presented in a list of harmonizing knowledge names, contents of the specified harmonizing knowledge.

16. A problem solving method comprising the processing steps of:

storing element knowledge each represented as a data block for denoting a goal or a subgoal or a strategy hierarchically organized for problem solving, plan generation and user guiding;

setting harmonizing knowledge represented as a data block for selecting and/or changing the element knowledge;

storing each content of the harmonizing knowledge in a memory called a slot;

selecting and/or changing the element knowledge in accordance with the contents of the harmonizing knowledge; and executing a plan generation and a problem solving by use of the element knowledge thus selected and/or changed;

wherein said setting harmonizing knowledge processing step includes a processing step of producing statistics of results data obtained from an execution of a plan.

17. A problem solving method according to claim 16 wherein said processing step of producing the statistics from the results data includes a processing step of displaying results of said statistic processing step on a display device when harmonizing knowledge is set.

18. A problem solving method comprising the processing steps of:

storing element knowledge each represented as a data block for denoting a goal or a subgoal or a strategy hierarchically organized for problem solving, plan generation and user guiding;

setting harmonizing knowledge represented as a data block for selecting and/or changing the element knowledge;

storing each content of the harmonizing knowledge in a memory called a slot;

selecting and/or changing the element knowledge in accordance with the contents of the harmonizing knowledge; and executing a plan generation and a problem solving by use of the element knowledge thus selected and/or changed;

wherein said setting harmonizing knowledge processing step includes a processing step of modifying the harmonizing knowledge in accordance with a result of an evaluation achieved on a result of a control conducted for restoring the plan.

19. A problem solving method comprising the processing steps of:

storing element knowledge each represented as a data block for denoting a goal or a subgoal or a strategy hierarchically organized for problem solving, plan generation and user guiding;

setting harmonizing knowledge represented as a data block for selecting and/or changing the element knowledge;

storing each content of the harmonizing knowledge in a memory called a slot;

selecting and/or changing the element knowledge in accordance with the contents of the harmonizing knowledge; and executing a plan generation and a problem solving by use of the element knowledge thus selected and/or changed;

wherein said harmonizing knowledge stored in said storing processing step includes a portion for storing therein harmonizing knowledge to be used to modify and/or to change the harmonizing knowledge.

20. A problem solving system comprising:

means for storing therein element knowledge each represented as a data block for denoting a goal or a subgoal or a strategy hierarchically organized for problem solving, plan generating, and user guiding;

means for setting harmonizing knowledge represented as a data block for selecting and/or changing the element knowledge;

means for storing each content of the harmonizing knowledge in a submemory called a slot;

means for selecting and/or changing the element knowledge in accordance with the contents of the harmonizing knowledge; and execution means for executing a plan generation and/or a problem solving by use of the element knowledge thus selected and/or changed, wherein the system is a train regulation system for restoring disturbances appearing in a train schedule diagram.

21. A problem solving system comprising:

means for storing therein element knowledge each represented as a data block for denoting a goal or a subgoal or a strategy hierarchically organized for problem solving, plan generating, and user guiding;

means for setting harmonizing knowledge represented as a data block for selecting and/or changing the element knowledge;

means for storing each content of the harmonizing knowledge in a submemory called a slot;

means for selecting and/or changing the element knowledge in accordance with the contents of the harmonizing knowledge; and execution means for executing a plan generation and/or a problem solving by use of the element knowledge thus selected and/or changed, wherein the harmonizing knowledge includes train numbers of trains each associated with a delay which wherein the harmonizing knowledge includes train numbers of trains each associated with a delay which repeatedly occurs, delay situations, and contents of train regulation operations for restoring the delays.

22. A problem solving system comprising:

means for storing therein element knowledge each represented as a data block for denoting a goal or a subgoal or a strategy hierarchically organized for problem solving, plan generating, and user guiding;

means for setting harmonizing knowledge represented as a data block for selecting and/or changing the element knowledge;

means for storing each content of the harmonizing knowledge in a submemory called a slot;

means for selecting and/or changing the element knowledge in accordance with the contents of the harmonizing knowledge; and execution means for executing a plan generation and/or a problem solving by use of the element knowledge thus selected and/or changed, wherein the system is a train group control system for controlling intervals between running trains.

* * * * *